United States Patent
Hull et al.

(10) Patent No.: US 10,386,131 B2
(45) Date of Patent: Aug. 20, 2019

(54) SELF-REGULATING THERMAL INSULATION AND RELATED METHODS

(71) Applicant: The Boeing Company, Chicago, IL (US)

(72) Inventors: John Ralph Hull, Sammamish, WA (US); Cameron K. Chen, Seattle, WA (US)

(73) Assignee: The Boeing Company, Chicago, IL (US)

( * ) Notice: Subject to any disclaimer, the term of this patent is extended or adjusted under 35 U.S.C. 154(b) by 483 days.

(21) Appl. No.: 14/941,066

(22) Filed: Nov. 13, 2015

(65) Prior Publication Data
US 2017/0138676 A1 May 18, 2017

(51) Int. Cl.
*F03G 7/06* (2006.01)
*B23P 19/00* (2006.01)
(Continued)

(52) U.S. Cl.
CPC .............. *F28F 13/00* (2013.01); *B23P 19/00* (2013.01); *F03G 7/065* (2013.01); *F16L 59/026* (2013.01);
(Continued)

(58) Field of Classification Search
CPC ... F28F 13/00; F28F 2013/008; F16L 59/026; F16L 59/06; B23P 19/00; F03G 7/065
See application file for complete search history.

(56) References Cited

U.S. PATENT DOCUMENTS

| 4,212,346 A | * | 7/1980 | Boyd | F25D 19/006 165/185 |
| 4,304,294 A | * | 12/1981 | Reisman | F42B 15/34 165/185 |

(Continued)

FOREIGN PATENT DOCUMENTS

| DE | 102012021062 | 4/2014 |
| EP | 1905653 | 4/2008 |
| JP | 07239089 | 9/1995 |

OTHER PUBLICATIONS

Cui, Z., "A Knowledge Base for Microfluidic Devices," Section 2.2.2, Rutherford Appleton Laboratory, UK. Downloaded on or about Aug. 19, 2015 from http://www.fi.tartu.ee/~jevgenis/Articles/Microfluids/info_microfluidics.html.

(Continued)

*Primary Examiner* — Ljiljana V. Ciric
(74) *Attorney, Agent, or Firm* — DASCENZO Intellectual Property Law, P.C.

(57) ABSTRACT

Presently disclosed self-regulating thermal insulation may include one or more thermal actuators that may expand and contract in response to changes in temperature adjacent the thermal insulation, thereby automatically changing the thermal resistance of the thermal insulation. In this manner, a self-regulating thermal insulation may be configured to locally adjust in response to local changes in temperature of a part being insulated, for example, during curing or some other manufacturing process. Such self-regulating thermal insulation may be configured to respond to temperature changes without feedback control systems, power, or human intervention. One example of self-regulating thermal insulation may include a first plate, a second plate, a support structure coupling the first plate and the second plate and defining an insulation thickness therebetween, an internal partition positioned between the first plate and the second (Continued)

plate, and at least one thermal actuator positioned between the second plate and the internal partition.

16 Claims, 8 Drawing Sheets

(51) Int. Cl.
    *F16L 59/02*       (2006.01)
    *F16L 59/06*       (2006.01)
    *F28F 13/00*       (2006.01)

(52) U.S. Cl.
    CPC ......... *F16L 59/06* (2013.01); *F28F 2013/008* (2013.01)

(56) References Cited

U.S. PATENT DOCUMENTS

| | | | |
|---|---|---|---|
| 4,909,313 A * | 3/1990 | Voss | F28F 13/00 165/46 |
| 5,562,154 A | 10/1996 | Benson et al. | |
| 2008/0258577 A1 * | 10/2008 | Gotsmann | B81B 3/0018 310/306 |
| 2013/0081786 A1 * | 4/2013 | Clark | F28F 13/00 165/96 |
| 2013/0126003 A1 * | 5/2013 | De Bruyker | H01L 23/34 137/13 |
| 2015/0246730 A1 | 9/2015 | Khozikov et al. | |
| 2017/0138677 A1 * | 5/2017 | Hull | F28F 13/14 |
| 2018/0258920 A1 * | 9/2018 | Kessler | H05B 1/0294 |
| 2018/0266401 A1 * | 9/2018 | van den Ende | F03G 7/005 |

OTHER PUBLICATIONS

Agilent Technologies. *Laser and Optics User's Manual*, Chapter 17: Material Expansion Coefficients, 12 pages, copyright 2002.
European Patent Office, Extended European Search Report for related European patent application EP 16180232, dated Apr. 20, 2017.
Machine generated English translation of the abstract of DE 102012021062, downloaded from Espacenet.com on Jun. 21, 2017.
Machine generated English translation of the abstract of EP 1905653, downloaded from Espacenet.com on Jun. 21, 2017.
Machine generated English translation of the abstract of JP 07239089, from European Patent Office.
Machine generated English translation of JP 07239089, from European Patent Office.

* cited by examiner

SELF-REGULATING THERMAL INSULATION AND RELATED METHODS

FIELD

The present disclosure relates to self-regulating thermal insulation and related methods.

BACKGROUND

Thermal processing is a frequent occurrence in manufacturing. Often it is desirable that a manufacturing process occur at a constant temperature for a set or minimum period of time. Thermal insulation is typically placed around a heated object to attempt to maintain a specified temperature range everywhere on the object. If the object is composed of a variety of materials with different thermal properties, or if the object is comprised of complex geometrical features or varying thicknesses at different locations, heat loss of the object may be non-homogenous (e.g., some areas of the object may lose heat faster than others). For such thermal processing, and especially with complex objects and thermal profiles, feedback control systems are utilized, in which the temperature of the object is monitored, and the heat input to the system is increased or decreased in accordance with the temperature feedback data. However, such temperature monitoring can be difficult, impractical, and/or expensive. Further, special insulation designs must be developed to accommodate non-uniform heat loss. In some applications, insulation is customized for a given object, in order to evenly heat a body that would naturally heat unevenly. Such temperature monitoring and complex, customized insulation adds significantly to manufacturing costs in thermal processing techniques.

SUMMARY

Generally, presently disclosed thermal actuators may include one or more first segments of a first material and one or more second segments of a second material. The second segments may be coupled to the first segments, which may be arranged to form a contiguous layer. By contrast, the second segments may be spaced apart from one another along the first segments. The different materials may have different thermal expansion coefficients, such that the thermal actuator may be configured to expand and contract in response to changes in temperature. For example, some thermal actuators may form a three-dimensional linear spiral shape, having a first actuator end and a second actuator end. Upon a change in temperature in one direction (e.g., an increase or decrease in temperature adjacent the thermal actuator), the thermal actuator may compress such that the first actuator end and the second actuator end are positioned closer together. Upon a change in temperature in the other direction, the thermal actuator may expand such that the first actuator end and the second actuator end are positioned farther apart.

Such thermal actuators may be incorporated into (e.g., positioned within) self-regulating thermal insulation, such that the thermal resistance of the self-regulating thermal insulation may automatically change in response to a change in temperature adjacent one or more sides of the thermal insulation (e.g., adjacent the thermal actuator). Such self-regulating thermal insulation may include a first plate, a second plate, a support structure that couples the first plate to the second plate, and at least one internal partition positioned between the first plate and the second plate. In some examples, the internal partitions may be movable with respect to the first plate and second plate. In some examples, the internal partitions may be substantially stationary with respect to the first plate and second plate. One or more thermal actuators may be positioned within the self-regulating thermal insulation. For example, one or more thermal actuators may be positioned between the second plate and a respective internal partition, and/or one or more thermal actuators may be positioned between adjacent respective internal partitions. Movement of the thermal actuators in response to temperature changes on either side of the self-regulating thermal insulation may effectuate changes in thermal resistance of the self-regulating thermal insulation. Methods of making and using thermal actuators and self-regulating thermal insulation also are disclosed.

DESCRIPTION

Presently disclosed self-regulating thermal insulation, thermal actuators, and self-regulating thermal insulation systems may provide for localized insulation that automatically adjusts its thermal resistance, in response to local changes in temperature of the object being insulated. Presently disclosed self-regulating thermal insulation and associated thermal actuators may be configured to be self-regulating, where different embodiments of self-regulating thermal insulation may utilize changes in convection properties and/or thermal conduction (e.g., via contact between components) in order to automatically adjust thermal resistance of the self-regulating thermal insulation. In this manner, the self-regulating thermal insulation may be configured to address one or more issues in the prior art, such as providing varying levels of insulation at various locations on the object (e.g., different areas of the self-regulating thermal insulation can account for non-uniform cooling patterns of the object), in response to non-uniform heat loss from the object due to the issues discussed above (e.g., complex geometries and materials having different thermal properties).

A self-regulating thermal insulation that can react to temperature of the body or object can eliminate the need for complex insulation features and may provide practical heating methods for structures that are conventionally difficult to heat, at less expensive costs that conventional specially designed insulation. Self-regulating thermal insulation may be configured to keep the process temperature significantly constant, in response to non-uniform heat loss from the part, changes in ambient temperature, and/or changes in the heating source, without requiring an electronic feedback control system, human intervention, temperature monitoring, and/or custom-designed insulation for specific parts. In some examples, presently disclosed self-regulating thermal insulation may be combined with heat sources, and/or other devices.

Figure 1:
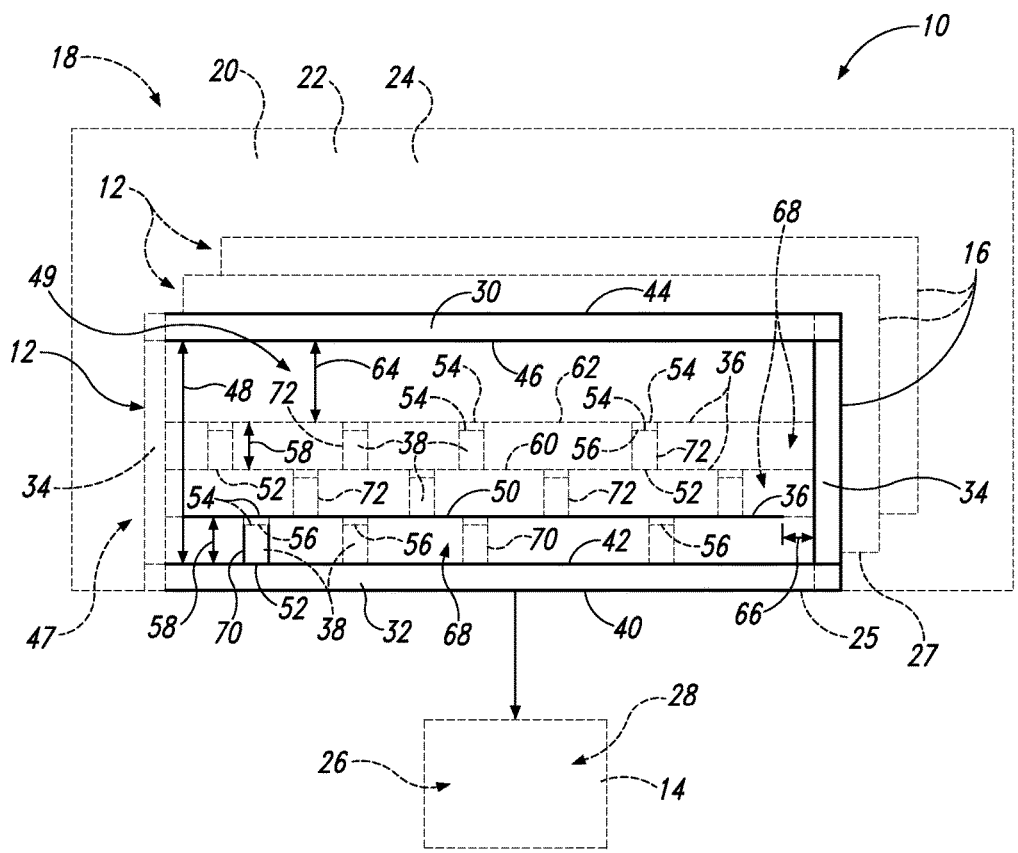
FIG. 1 is a schematic view of illustrative, non-exclusive examples of self-regulating thermal insulation systems according to the present disclosure.

FIG. 1 illustrates a schematic diagram of non-exclusive examples of self-regulating thermal insulation systems 10 (also referred to herein as systems 10), according to the present disclosure. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Generally, self-regulating thermal insulations systems 10 may include a self-regulating thermal insulation 12 that may be configured for insulating a body 14. In some examples, self-regulating thermal insulation systems 10 may additionally include body 14. Body 14 may be, for example, an object or a portion thereof, a structure or a portion thereof, a part (e.g., a composite part) or a portion thereof, an apparatus or a portion thereof, a vehicle or a portion thereof, a dwelling or a portion thereof, a building or a portion thereof, an aircraft or a portion thereof, an aircraft component or portion thereof, a person or a portion thereof, and/or an animal or a portion thereof. In some examples, self-regulating thermal insulation 12 may be used to insulate body 14 (e.g., a composite part or a portion thereof) temporarily (e.g., for a period of minutes or hours), such as by keeping a process temperature of body 14 substantially constant or within a predetermined range during curing, or some other manufacturing process. In some examples, self-regulating thermal insulation 12 may be used to insulate body 14 on a permanent or semi-permanent basis (e.g., long term; such as for more than a day). For example, self-regulating thermal insulation 12 may be installed within a building or dwelling instead of or in addition to conventional insulation materials. Self-regulating thermal insulation 12 may be coupled to body 14, in contact with body 14, and/or covering at least a portion of body 14, while in use.

In some examples, self-regulating thermal insulation system 10 may include a plurality of pieces 16 of self-regulating thermal insulation 12. Plurality of pieces 16 may be coupled with respect to one another. For example, each piece 16 of plurality of pieces 16 may be coupled to at least one other respective piece 16 of the plurality of pieces 16 of self-regulating thermal insulation 12. In some systems 10, each piece 16 of self-regulating thermal insulation 12 may be coupled to and/or contained within a substrate 18. For example, self-regulating thermal insulation 12 and/or plurality of pieces 16 of self-regulating thermal insulation 12 may be coupled to or contained in a blanket 20, encased in silicone 22, and/or positioned within a fabric cover 24. For example, substrate 18 may be a blanket 20, with a plurality of pieces 16 of self-regulating thermal insulation 12 sewn or otherwise coupled thereto, contained between adjacent layers of blanket 20, and/or may be formed of joined pieces 16 of self-regulating thermal insulation 12. In some systems 10, substrate 18 may be a flexible material, such as a continuous sheet of insulation material. In some systems 10, substrate 18 may be sized and shaped to cover at least a portion of body 14. In some systems 10, each piece 16 of self-regulating thermal insulation 12 and/or substrate 18 may be a rigid or semi-rigid structure.

In some self-regulating thermal insulation systems 10 containing a plurality of pieces 16 of self-regulating thermal insulation 12, respective adjacent pieces 16 of self-regulating thermal insulation 12 may be coupled together, such as by a connector, a weld, a brazed joint, a solder joint, a hinged joint, a flexible joint, and/or an adhesive. Respective pieces 16 of self-regulating thermal insulation 12 may be thermally isolated from other respective pieces 16 of self-regulating thermal insulation 12 such that the thermal resistance of each individual piece 16 of self-regulating thermal insulation 12 may automatically change independently of the thermal resistance of other respective pieces 16 of self-regulating thermal insulation 12, in response to respective local temperatures adjacent the individual pieces 16 of self-regulating thermal insulation 12. For example, a first thermal resistance of a first piece 25 of self-regulating thermal insulation 12 adjacent a first portion 26 of body 14 may automatically change in response to changes in a first local object temperature adjacent first portion 26 of body 14 when first piece 25 of self-regulating thermal insulation 12 is positioned adjacent first portion 26 of body 14, and a second thermal resistance of a second piece 27 of self-regulating thermal insulation 12 may automatically change (independently of the first thermal resistance and the first local object temperature) in response to changes in a second local object temperature adjacent a second portion 28 of body 14, when second piece 27 of self-regulating thermal insulation 12 is positioned adjacent second portion 28 of body 14. In other words, the respective local object temperature of body 14 may determine the temperature adjacent self-regulating thermal insulation 12 when the same is positioned on or adjacent body 14. Thus, a respective piece 16 of self-regulating thermal insulation 12 (e.g., first piece 25) may have a different thermal resistance at a given time than does a different respective piece 16 of self-regulating thermal insulation 12 (e.g., second piece 27), within the same self-regulating thermal insulation system 10.

Each piece 16 of self-regulating thermal insulation 12 may include a first plate 30, a second plate 32, one or more support structures 34 coupling first plate 30 to second plate 32, and one or more internal partitions 36 positioned between first plate 30 and second plate 32. Self-regulating thermal insulation 12 may include one or more thermal actuators 38. One or more thermal actuators 38 may be positioned between second plate 32 and a respective internal partition 36, and/or one or more thermal actuators 38 may be positioned between respective adjacent internal partitions 36.

In use, self-regulating thermal insulation 12 may be positioned with respect to body 14 such that a second outer surface 40 of second plate 32 faces body 14. For example, second outer surface 40 of second plate 32 may contact body 14 and/or be positioned adjacent body 14. Opposite second outer surface 40, second plate 32 may include a second inner surface 42. Similarly, first plate 30 may include a first outer surface 44 and a first inner surface 46 opposite first outer surface 44. First plate 30 and second plate 32 may be arranged with respect to one another such that first inner surface 46 of first plate 30 faces second inner surface 42 of second plate 32. Support structure 34 may be configured to separate first plate 30 from second plate 32 by an insulation thickness 48, which may remain substantially constant. In some self-regulating thermal insulation systems 10, self-regulating thermal insulation 12 may include a support structure 34 that extends around the periphery of first plate 30 and second plate 32, such that support structure 34 may substantially seal an interior portion 49 of self-regulating thermal insulation 12 from the ambient environment, with interior portion 49 being defined by first plate 30, second plate 32, and support structure 34. In other systems 10, support structure 34 may be present at some portions of self-regulating thermal insulation 12, and absent at other portions. Thus, self-regulating thermal insulation 12 may have an open end 47, thereby venting interior portion 49 of self-regulating thermal insulation 12 to an ambient environment. Depending on the particular configuration of self-regulating thermal insulation 12, open end 47 may be positioned opposite support structure 34 in some examples.

Self-regulating thermal insulation 12 may be configured such that its thermal resistance may automatically change in response to a change in temperature adjacent first outer surface 44 of first plate 30 and/or second outer surface 40 of second plate 32. For example, a change in a process temperature of body 14 adjacent second outer surface 40 of second plate 32, and/or a change in ambient temperature adjacent first outer surface 44 of first plate 30 may cause self-regulating thermal insulation 12 to self-regulate (e.g., its thermal resistance may automatically change). Self-regulating thermal insulation 12 may be configured such that changes in thermal resistance may occur without the use of a feedback control system (e.g., an electronic feedback system), without a power source, without the use of monitoring, and/or without human intervention.

In some examples, each internal partition 36 may be coupled to support structure 34 such that the internal partitions 36 are substantially stationary (e.g., substantially fixed) with respect to one another and with respect to first plate 30 and second plate 32. As will be described in more detail below, in these examples, thermal actuators 38 may be coupled adjacent a second actuator end 52 (e.g., coupled to second plate 32 or to a respective internal partition 36), but not adjacent a first actuator end 54, such that when thermal actuators 38 are compressed, their respective first actuator ends 54 do not contact a respective internal partition 36, but when thermal actuators 38 are expanded (e.g., in response to an increase in temperature adjacent second plate 32), first actuator ends 54 may move towards and/or contact a respective internal partition 36. Such contact may occur with increasing pressure as the temperature increases. In this manner, heat may be conducted through a portion of self-regulating thermal insulation 12 via thermal contact between thermal actuators 38 and internal partitions 36. When thermal actuators 38 do not contact respective internal partitions 36, heat conductance is eliminated or reduced, thereby automatically changing the thermal resistance of self-regulating thermal insulation 12 in response to a change in temperature.

In some examples, each internal partition 36 may be free from connection to support structure 34, such that each internal partition 36 may be moveable with respect to first plate 30, second plate 32, and support structure 34, in response to a change in temperature adjacent first outer surface 44 and/or second outer surface 40. In these examples, thermal actuators 38 may be coupled adjacent both first actuator end 54 (e.g., to a respective internal partition 36) and adjacent second actuator end 52 (e.g., to a different respective internal partition 36, or to second plate 32, such as to second inner surface 42 of second plate 32). Similar to the examples described above, thermal actuators 38 may expand and contract in response to temperature changes adjacent first plate 30 and/or second plate 32, but such expansion and contraction also moves internal partitions 36 with respect to first plate 30 and second plate 32. For example, contraction of thermal actuators 38 (such as in response to an increase in temperature adjacent second plate 32) may cause movement of internal partitions 36 towards second plate 32, thereby decreasing a distance 58 between respective internal partitions 36 (or between a first internal partition 50 and second plate 32). Such movement of internal partitions 36 may change the natural convection conductions within self-regulating thermal insulation 12, thereby changing (e.g. reducing) the thermal resistance of self-regulating thermal insulation 12.

On the other hand, a reduction in the temperature adjacent second plate 32 may cause thermal actuators 38 to expand, thereby moving internal partitions 36 and increasing distance 58 between respective adjacent internal partitions 36, and increasing the thermal resistance of self-regulating thermal insulation 12. In this manner, the thermal resistance of self-regulating thermal insulation 12 may automatically change in response to temperature changes, such as local object temperatures of body 14 adjacent self-regulating thermal insulation 12. Thus, when it is desired that body 14 be kept at a uniform temperature, and some areas of body 14 lose heat faster than others, presently disclosed self-regulating thermal insulation systems 10 may be employed to result in a more uniform temperature in different areas of body 14.

As shown in FIG. 1, self-regulating thermal insulation 12 may include a plurality of internal partitions 36, each respective internal partition 36 being spaced apart from one another, and positioned between first plate 30 and second plate 32. The schematic representation of FIG. 1 shows one internal partition 36 in solid line, and two additional internal partitions 36 in dashed line. In other examples, more or fewer internal partitions 36 may be included within a given self-regulating thermal insulation 12. For example, self-regulating thermal insulation 12 may include one or more, two or more, three or more, four or more, five or more, six or more, seven or more, eight or more, nine or more, ten or more, twelve or more, fifteen or more, and/or twenty or more internal partitions 36. Between each respective adjacent pair of internal partitions 36 (and between first internal partition 50 and second plate 32), one or more thermal actuators 38 may be positioned. For example, one or more, two or more, three or more, four or more, five or more, six or more, seven or more, eight or more, nine or more, ten or more, twelve or more, fifteen or more, and/or twenty or more thermal actuators 38 may be positioned between respective adjacent pairs of internal partitions 36, and/or between first internal partition 50 and second plate 32.

In examples including a plurality of internal partitions 36, at least one thermal actuator 38 may be positioned between each respective adjacent pair of internal partitions 36 (e.g., at least one thermal actuator 38 may be positioned between first internal partition 50 and a second internal partition 60, and at least one thermal actuator 38 may be positioned between second internal partition 60 and a third internal partition 62, and so on, for each respective pair of adjacent internal partitions 36). Thermal actuators 38 positioned between second plate 32 and first internal partition 50 may be referred to as base actuators 70, and thermal actuators 38 positioned between respective adjacent internal partitions 36 (e.g., between first internal partition 50 and second internal partition 60) may be referred to as internal actuators 72. As shown in FIG. 1, in some examples, there may be no thermal actuators 38 positioned between the respective internal partition 36 adjacent first plate 30 (e.g., third internal partition 62) and first plate 30. Thus, first plate 30 may be uncoupled to any internal partitions 36 in some examples.

Some examples of self-regulating thermal insulations 12 and/or self-regulating thermal insulation systems 10 may include more than one different type of thermal actuator 38. Within a given layer (e.g., between first internal partition 50 and second plate 32, or between first internal partition 50 and a second internal partition 60), respective adjacent thermal actuators 38 may be spaced apart from one other. Between layers, respective thermal actuators 38 may be staggered with respect to one another, as shown in FIG. 1 (e.g., each thermal actuator 38 positioned between first internal partition 50 and second internal partition 60 may be spaced between respective adjacent thermal actuators 38 positioned between first internal partition 50 and second plate 32, when viewed from above). Additionally or alternatively, a given self-regulating thermal insulation 12 may include a plurality of thermal actuators 38 having a range of temperatures over which thermal actuators 38 respectively actuate. For example, among a plurality of thermal actuators 38, some examples include thermal actuators 38 which are configured to respectively contact a respective internal partition 36 at a range of respective temperatures.

As discussed, each thermal actuator 38 may be configured to automatically move (e.g., expand or contract) with respect to first plate 30 and/or second plate 32, in response to a change in temperature adjacent first outer surface 44 of first plate 30 and/or a change in temperature adjacent second outer surface 40 of second plate 32. In examples of self-regulating thermal insulations 12 where internal partitions 36 are substantially stationary, such movement of thermal actuators 38 may also be movement with respect to a respective internal partition 36. In examples where internal partitions 36 are moveable with respect to first plate 30 and second plate 32, such movement of thermal actuators 38 may also cause movement of one or more respective internal partitions 36 (e.g., contraction of a respective thermal actuator 38 may cause a respective internal partition 36 to which it is coupled to move, such as towards second plate 32). Such movement of thermal actuators 38 and/or internal partitions 36 may automatically change the thermal resistance of self-regulating thermal insulation 12 (e.g., by changing natural convection conditions within self-regulating thermal insulation 12 and/or by changing thermal conduction conditions within self-regulating thermal insulation 12). Such changes in thermal resistance and movements of thermal actuators 38 and/or internal partitions 36 may be described as a change in configuration of self-regulating thermal insulation 12. For example, self-regulating thermal insulation 12 may be configured to transition through a continuum of configurations between a first configuration and a second configuration, in response to such changes in temperature.

In some examples, self-regulating thermal insulation 12 may automatically transition towards the second configuration in response to an increase in temperature adjacent second outer surface 40 of second plate 32, and may automatically transition towards the first configuration in response to a decrease in temperature adjacent second outer surface 40 of second plate 32. Additionally or alternatively, self-regulating thermal insulation 12 may automatically transition towards the first configuration in response to a decrease in temperature adjacent first outer surface 44 of first plate 30, and may automatically transition towards the second configuration in response to an increase in temperature adjacent first outer surface 44 of first plate 30. In some examples, the first configuration may correspond to a maximum thermal resistance of self-regulating thermal insulation 12, and the thermal resistance of self-regulating thermal insulation 12 in the second configuration may be decreased as compared to the thermal resistance in the first configuration.

Put another way, in some examples, self-regulating thermal insulation 12 may be configured such that a decrease in temperature adjacent second outer surface 40 of second plate 32 and/or adjacent first outer surface 44 of first plate 30 causes actuation of thermal actuators 38, and increases the thermal resistance of self-regulating thermal insulation 12. In some examples, thermal actuators 38 expand in order to effectuate transitioning towards the first configuration and increasing the thermal resistance of self-regulating thermal insulation 12. In other examples, thermal actuators 38 contract in order to effectuate transitioning towards the first configuration and increasing the thermal resistance of self-regulating thermal insulation 12. Similarly, in some examples, self-regulating thermal insulation 12 may be configured such that an increase in temperature adjacent second outer surface 40 of second plate 32 and/or adjacent first outer surface 44 of first plate 30 causes actuation of thermal actuators 38, and decreases the thermal resistance of self-regulating thermal insulation 12. Thermal actuators 38 may be configured to contract in order to effectuate transitioning towards the second configuration and decreasing the thermal resistance of self-regulating thermal insulation 12, or thermal actuators 38 may be configured to expand in order to effectuate transitioning towards the second configuration and decreasing the thermal resistance of self-regulating thermal insulation 12.

In some examples, each internal partition 36 is substantially equally spaced apart from a respective adjacent internal partition 36 by distance 58. In some self-regulating thermal insulations 12, distance 58 may remain substantially constant (e.g., internal partitions 36 substantially do not move with respect to first plate 30 and second plate 32). In other self-regulating thermal insulations 12, distance 58 may correspond to the approximate distance between respective adjacent internal partitions 36 when self-regulating thermal insulation 12 is in the first configuration, and distance 58 may decrease as self-regulating insulation 12 transitions towards the second configuration (e.g., as internal partitions 36 move towards second plate 32 due to contraction of thermal actuators 38), as will be described in more detail in connection with FIGS. 3-4. A gap length 64 between first inner surface 46 of first plate 30 and the respective internal partition 36 adjacent first plate 30 (e.g., third internal partition 62, in FIG. 1) may be less than, substantially equal to, or greater than distance 58. In some examples, gap length 64 may be substantially constant as self-regulating thermal insulation 12 transitions from the first configuration to the second configuration, or vice versa (e.g., in examples where internal partitions are substantially stationary with respect to first plate 30 and second plate 32). In other examples, gap length 64 may increase as self-regulating thermal insulation 12 transitions towards the second configuration (e.g., as third internal partition 62 moves towards second plate 32), and gap length 64 may decrease as self-regulating thermal insulation 12 transitions towards the first configuration.

In some examples, when self-regulating thermal insulation 12 is in the first configuration, first actuator ends 54 may be free from contact with respective internal partitions 36, as indicated by dashed lines 56 (e.g., there may be a space between respective first actuator ends 54 and respective internal partitions 36). Thermal actuators 38 may expand and contract between adjacent respective internal partitions 36 (or between second plate 32 and first internal partition 50), through a range of heights, between the first configuration, representing the most compressed state of thermal actuator 38, and a second configuration (representing the most expanded state of thermal actuator 38), where thermal actuator 38 may contact a respective internal partition 36 adjacent first actuator end 54 in the second configuration. When the temperature adjacent second outer surface 40 of second plate 32 continues to increase, thermal actuators 38 may contact the respective internal partition 36 with increasing pressure, thereby further decreasing the thermal resistance of self-regulating thermal insulation 12. In this manner, by virtue of the contact between thermal actuators 38 and respective internal partitions 36, thermal conduction may occur between respective adjacent internal partitions 36 and/or between second plate 32 and first internal partition 50.

Support structure 34 may be a rigid, semi-rigid, or flexible support structure 34 in various examples of self-regulating thermal insulation 12. Support structure 34 may be a thermal insulator. In some examples, each respective internal partition 36 may be separated from support structure 34 by a gap or space 66. Space 66 may be smaller than or approximately equal to distance 58 between second plate 32 and first internal partition 50. Similarly, space 66 may be smaller than or approximately equal to distance 58 between respective adjacent internal partitions 36. Space 66 may be small enough to substantially prevent natural convection between respective internal partitions 36 and support structure 34.

First plate 30, second plate 32, and/or internal partitions 36 may be stiff plates in some examples. For example, first plate 30, second plate 32, and/or internal partitions 36 may be composed of a metal such as aluminum, one or more polymers, one or more composite materials, and/or combinations thereof. First plate 30, second plate 32, and/or internal partitions 36 may be configured to provide a barrier to heat and/or air. First plate 30, second plate 32, and/or internal partitions 36 may be thermal insulators. A partition space 68 between each respective pair of adjacent internal partitions (and between second plate 32 and first internal partition 50) may contain, for example, a gas.

Various components of self-regulating thermal insulation 12 may be coupled in any suitable fashion. For example, thermal actuators 38 may be coupled to second plate 32 (e.g., to second inner surface 42 of second plate 32) and/or to one or more respective internal partitions 36, respective internal partitions 36 may be coupled to support structure 34, first plate 30 may be coupled to support structure 34, and/or second plate 32 may be coupled to support structure 34 in any suitable fashion. One or more thermal actuators 38 may be coupled to second plate 32 adjacent their respective second actuator ends 52. One or more thermal actuators 38 may be coupled to one or more respective internal partitions 36 adjacent their respective first actuator ends 54 and/or their respective second actuator ends 52. Examples of couplings for each of these components may include a fastener, a rivet, a nut, a bolt, an adhesive, a weld, a solder joint, a diffusion bond, and/or a brazed joint. Additionally or alternatively, one or more thermal actuators 38 may be plasma sprayed and/or electrochemically deposited on second inner surface 42 of second plate 32 or on a respective internal partition 36, adjacent the actuators' respective first actuator ends 54 and/or second actuator ends 52.

Figure 2:
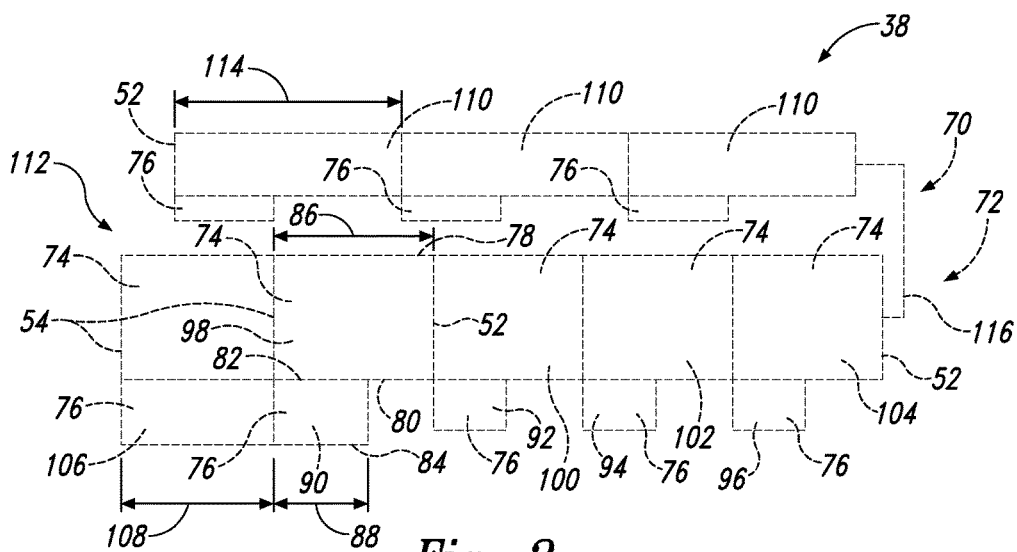
FIG. 2 is a schematic view of illustrative, non-exclusive examples of thermal actuators according to the present disclosure.

Turning now to FIG. 2, a schematic representation of non-exclusive examples of thermal actuators 38 is shown. Presently disclosed thermal actuators 38 may be configured to move in response to a change in temperature of the thermal actuator, and may generally include a first segment 74 and a second segment 76 that are coupled together. First segment 74 may be composed of a first material having a first thermal expansion coefficient, and second segment 76 may be composed of a second material having a second thermal expansion coefficient that is different from the first thermal expansion coefficient. The first material may be a first metallic material, and the second material may be a second metallic material in some examples, thereby forming a bi-metallic thermal actuator. Due to the configuration of thermal actuators 38 (e.g., at least in part due to the different thermal properties of the first material and the second material), thermal actuators 38 may automatically expand and contract in response to respective changes in temperature.

First segment 74 may have a first upper surface 78 and a first lower surface 80 opposite first upper surface. Similarly, second segment 76 may have a second upper surface 82 and a second lower surface 84 opposite second upper surface 82. Generally, first segment 74 forms a contiguous layer, which may consist of one first segment 74 or a plurality of first segments 74 coupled together to form the contiguous layer. As used herein, a plurality of segments forms a "contiguous layer" if at least a portion of neighboring respective segments are touching or sharing a common edge. First segment 74 (or each first segment 74, in thermal actuators 38 having a plurality of first segments 74) may have a first length 86, and second segment 76 (or each second segment 76, in thermal actuators 38 having a plurality of second segments 76) may have a second length 88, where second length 88 may be less than first length 86. In some examples having a plurality of first segments 74 and a plurality of second segments 76, each respective first segment 74 may have a respective first length 86, and each respective second segment 76 may have a respective second length 88. In such examples, the respective first lengths 86 need not all be equal to one another, but may be substantially equal. Similarly, the respective second lengths 88 need not all be equal to one another, but may be substantially equal. In these cases, each respective second length 88 of a respective second segment 76 may be less than the respective first length 86 of the respective first segment 74 to which the respective second segment 76 is coupled.

While first segment 74 forms a contiguous layer, in thermal actuators 38 having a plurality of second segments 76, respective adjacent second segments 76 may be spaced apart from one another along first segment 74. Second upper surface 82 of each respective second segment 76 may be coupled to first lower surface 80 of first segment 74. Second segment 76 may be in contact with first segment 74 (or a respective first segment 74 of a plurality of first segments 74) along the entire second length 88 of second segment 76. First upper surface 78 may be substantially parallel to first lower surface 80. Similarly, second upper surface 82 may be substantially parallel to second lower surface 84. As used herein, the descriptors "upper" and "lower" are used for convenient reference to the orientation shown in the figures, but are not meant to be limiting of presently disclosed thermal actuators 38, self-regulating thermal insulations 12, or self-regulating thermal insulation systems 10.

Thermal actuator 38 may extend from first actuator end 54 to second actuator end 52. Thermal actuator 38 may be configured to expand such that first actuator end 54 and second actuator end 52 expand away from each other in response to a change in temperature (e.g., in response to an increase or decrease in temperature of the thermal actuator). Thermal actuator 38 may be configured to contract such that first actuator end 54 and second actuator end 52 move towards each other in response to a change in temperature (e.g., in response to an increase or decrease in temperature of the thermal actuator). For example, some thermal actuators 38 may expand in response to an increase in temperature, and contract in response to a decrease in temperature. Other thermal actuators 38 may contract in response to an increase in temperature, and expand in response to a decrease in temperature. As used herein, the actuator ends (e.g., first actuator end 54 and second actuator end 52) may be said to "expand away from each other" or "contract towards each other" even if one or both of the actuator ends are fixed and/or immovable. For example, in thermal actuators 38 where second actuator end 52 is coupled to a second plate (e.g., second plate 32) of a self-regulating thermal insulation (e.g., self-regulating thermal insulation 12), the ends of thermal actuator 38 may still "expand away from each other" and "contract towards each other" even though first actuator end 54 may be the only actuator end that changes position with respect to second plate 32.

Thermal actuators 38 may include a plurality of second segments 76, spaced apart along first lower surface 80 of first segment 74. Thermal actuators 38 may include any number of second segments 76, such as one or more, two or more, three or more, four or more, five or more, six or more, seven or more, eight or more, nine or more, ten or more, twelve or more, fifteen or more, and/or twenty or more second segments 76. For example, thermal actuator 38 may include a first second segment 90, a second second segment 92, a third second segment 94, and a fourth second segment 96, each being spaced apart from each other, as shown in FIG. 2. In other words, respective adjacent second segments 76 may be arranged such that they do not contact one another. By contrast, in thermal actuators 38 including a plurality of first segments 74, respective adjacent first segments 74 may contact one another and/or be coupled together to form a contiguous layer. For example, thermal actuator 38 may include a first first segment 98, a second first segment 100, a third first segment 102, and a fourth first segment 104, each contacting and/or coupled together to form the contiguous layer. Thermal actuators 38 may include any number of first segments 74, such as at least 1 first segment 74, at least 2 first segments 74, at least 3 first segments 74, at least 4 first segments 74, at least 5 first segments 74, at least 6 first segments 74, at least 7 first segments 74, at least 8 first segments 74, at least 9 first segments 74, at least 10 first segments 74, at least 12 first segments 74, at least 15 first segments 74, at least 20 first segments 74, at least 25 first segments 74, at least 30 first segments 74, and/or at least 50 first segments 74.

In some examples, first segment 74 may be a continuous layer, integrally formed from a single piece of material. Thermal actuators 38 may include any number of second segments 76, such as at least 1 second segment 76, least 2 second segments 76, at least 3 second segments 76, at least 4 second segments 76, at least 5 second segments 76, at least 6 second segments 76, at least 7 second segments 76, at least 8 second segments 76, at least 9 second segments 76, at least 10 second segments 76, at least 12 second segments 76, at least 15 second segments 76, at least 20 second segments 76, at least 25 second segments 76, at least 30 second segments 76, and/or at least 50 second segments 76. In some thermal actuators 38, the number of second segments 76 may be the same as the number of first segments 74.

Some thermal actuators 38 may include a base segment 106, which may be composed of the second material, just like second segment 76, however, base segment 106 may have a base length 108 that is greater than second length 88 of second segment 76 (or second segments 76), and/or substantially equal to first length 86 of first segment 74 (or a respective one of first segments 74). Some thermal actuators 38 may include just a single base segment 106 instead of second segment 76. Some thermal actuators 38 may include one or more base segments 106 in addition to one or more second segments 76. Like second segments 76, base segment 106 may be coupled to first lower surface 80 of first segment 74 and spaced apart from the respective adjacent second segment 76, if any.

In some examples, thermal actuator 38 may include one or more outer segments 110 arranged about an outer edge 112 of first segment 74 (or a plurality of first segments 74). Outer segments 110 may be composed of the first material, and each outer segment 110 may have a second segment 76 (or a different length segment composed of the second material) coupled thereto. Outer segments 110 may be similar to first segments 74, except that outer segments 110 may have an outer segment length 114 that is longer than first length 86 of first segment 74. Such thermal actuators 38 may additionally include a transition segment 116 that is configured to couple a respective first segment 74 to a respective outer segment 110.

First segments 74 (or one continuous first segment 74) may be arranged in any suitable overall shape. In some thermal actuators 38, first segments 74 (or one continuous first segment 74) may be arranged to form a coil shape, a linear spiral, a three-dimensional sinusoidal shape, and/or a three-dimensional nested shape. The first material may be any suitable material, such as one or more of iron, aluminum, zinc, tungsten, titanium, steel, silver, platinum, palladium, nickel, manganese, carbon, gold, copper, bronze, and combinations thereof. Similarly, the second material may be any suitable material, such as one or more of iron, aluminum, zinc, tungsten, titanium, steel, silver, platinum, palladium, nickel, manganese, carbon, gold, copper, bronze, and combinations thereof. In some examples, the thermal expansion coefficient of the first material (also referred to as the "first thermal expansion coefficient") may be greater than the thermal expansion coefficient of the second material (also referred to as the "second thermal expansion coefficient"). For example, the thermal expansion coefficient of the first material may be at least 1.1 times the second thermal expansion coefficient, at least 1.25 times the second thermal expansion coefficient, at least 1.5 times the second thermal expansion coefficient, at least 1.75 times the second thermal expansion coefficient, at least 2 times the second thermal expansion coefficient, at least 3 times the second thermal expansion coefficient, and/or at least 5 times the second thermal expansion coefficient. In some examples, the thermal expansion coefficient of the second material may be greater than the thermal expansion coefficient of the first material. For example, the second thermal expansion coefficient may be at least 1.1 times the first thermal expansion coefficient, at least 1.25 times the first thermal expansion coefficient, at least 1.5 times the first thermal expansion coefficient, at least 1.75 times the first thermal expansion coefficient, at least 2 times the first thermal expansion coefficient, at least 3 times the first thermal expansion coefficient, and/or at least 5 times the first thermal expansion coefficient.

Thermal actuators 38 may be incorporated into a self-regulating thermal insulation (e.g., self-regulating thermal insulation 12 of FIG. 1), such as by being positioned within the self-regulating thermal insulation (e.g., between the second plate 32 and an adajcent internal partition 36, between respective adjacent internal partitions 36, etc., as shown in FIG. 1). As so incorporated, thermal actuators 38 may be configured to automatically change the thermal resistance of the self-regulating thermal insulation. For example, expansion and contraction of thermal actuators 38 may cause changes in convection conduction and/or thermal conductance conditions in a self-regulating thermal insulation according to the present disclosure. Thermal actuators 38 may be configured to expand and contract any suitable amount, depending on scale and the particular application. In some examples, thermal actuator 38 may be configured to expand at least 0.005 mm, at least 0.01 mm, at least 0.02 mm, at least 0.05 mm, at least 0.1 mm, at least 0.2 mm, at least 0.25 mm, at least 0.5 mm, and/or at least 1 mm in response to a change in temperature of thermal actuator 38. Similarly, thermal actuator 38 may be configured to contract at least 0.005 millimeters (mm), at least 0.01 mm, at least 0.02 mm, at least 0.05 mm, at least 0.1 mm, at least 0.2 mm, at least 0.25 mm, at least 0.5 mm, and/or at least 1 mm in response to a change in temperature of thermal actuator 38.

In thermal actuators 38 including a plurality of first segments 74, respective adjacent first segments 74 may be coupled together in any suitable manner, such as with a respective weld, a respective solder joint, an adhesive, and/or a respective brazed joint. Each respective second segment 76 may be coupled to a respective first segment 74 in any suitable manner, such as with a respective weld, a respective solder joint, an adhesive, a respective brazed joint, a respective diffusion bond, and/or with plasma spraying and/or electrochemical deposition.

Turning now to FIGS. 3-12, illustrative non-exclusive examples of self-regulating thermal insulation 12 and thermal actuators 38 are illustrated. Where appropriate, the reference numerals from the schematic illustrations of FIGS. 1-2 are used to designate corresponding parts of FIGS. 3-12; however, the examples of FIGS. 3-12 are non-exclusive and do not limit self-regulating thermal insulation 12 or thermal actuators 38 to the illustrated embodiments of FIGS. 3-12. That is, self-regulating thermal insulations 12 and thermal actuators 38 are not limited to the specific embodiments illustrated and may incorporate any number of the various aspects, configurations, characteristics, properties, etc. that are illustrated in and discussed with reference to the schematic representations of FIGS. 1-2 and/or the embodiments of FIGS. 3-12, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to FIGS. 3-12; however, it is within the scope of the present disclosure that the previously discussed features, variants, etc. may be utilized with such embodiments.

Figure 3:
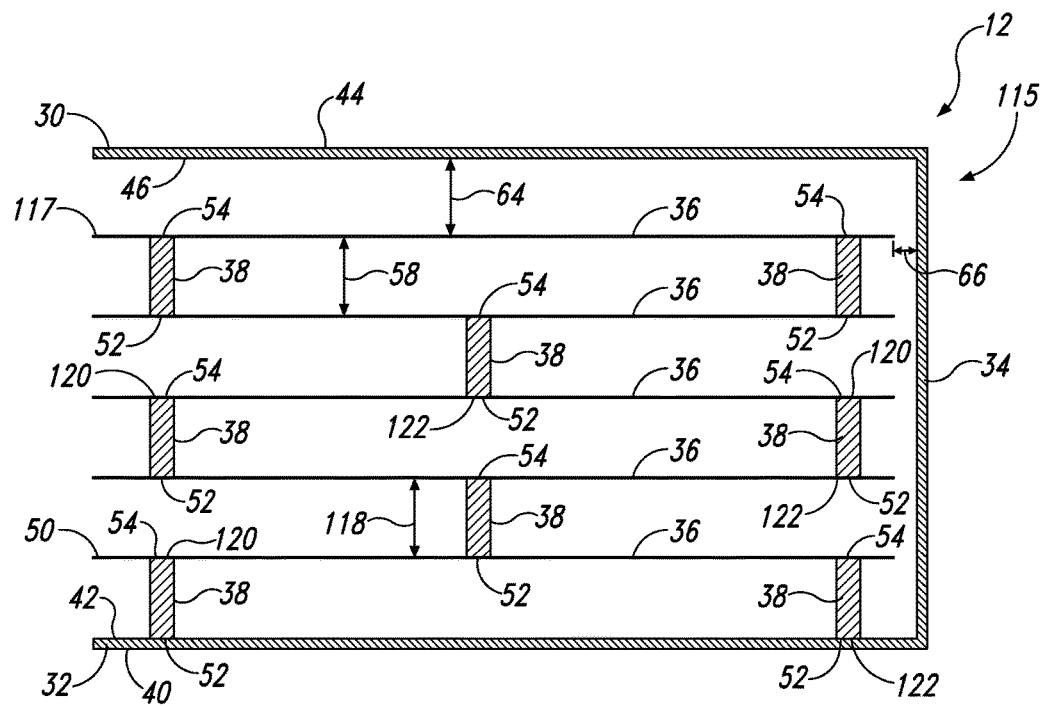
FIG. 3 is a schematic, cross-sectional view of one example of self-regulating thermal insulation according to the present disclosure, in a first configuration.
Figure 4:
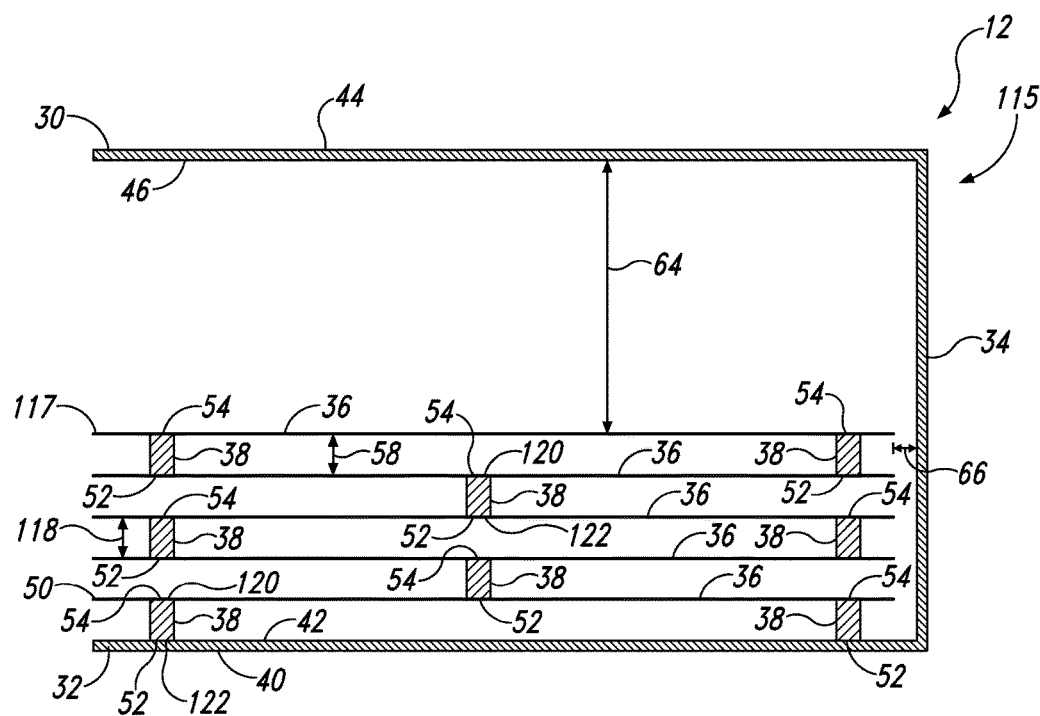
FIG. 4 is a schematic view of the self-regulating thermal insulation of FIG. 3, in a second configuration.

FIGS. 3-4 schematically illustrate a cross-section of a self-regulating thermal insulation 115, which is an example of self-regulating thermal insulation 12, having a plurality of thermal actuators 38. Self-regulating thermal insulation 115 includes first plate 30, second plate 32, and a plurality (in this case, 5) of internal partitions 36 spaced apart and positioned between first plate 30 and second plate 32. Support structure 34 couples first plate 30 with respect to second plate 32. In the example of FIGS. 3-4, internal partitions 36 are not coupled to support structure 34, such that a respective space 66 exists between each respective internal partition 36 and support structure 34. FIG. 3 represents self-regulating thermal insulation 115 in a first configuration, having a maximum thermal resistance, and FIG. 4 represents self-regulating thermal insulation 115 in a second configuration, having a minimum thermal resistance.

In FIGS. 3-4, thermal actuators 38 are coupled at their respective first actuator ends 54 to a respective internal partition 36. Thermal actuators 38 may be configured to contract in response to an increase in temperature, and internal partitions 36 may be moveable with respect to first plate 30 and second plate 32. Thus, as self-regulating thermal insulation 115 transitions from the first configuration (FIG. 3) towards the second configuration (FIG. 4), thermal actuators 38 may contract in length, and cause each internal partition 36 to move towards second plate 32. In so doing, distance 58 between respective internal partitions 36 (or between second plate 32 and first internal partition 50) is decreased. Such transitioning towards the second configuration may be caused by an increase in temperature adjacent second plate 32 (e.g., second outer surface 40 of second plate 32) and/or by a decrease in temperature adjacent first plate 30 (e.g., first outer surface 44 of first plate 30). While distance 58 may be reduced in the second configuration (FIG. 4) as compared to the first configuration (FIG. 3), gap length 64 between first plate 30 and the respective adjacent internal partition 36 (e.g., a fifth internal partition 117) may be larger in the second configuration than in the first configuration, due to movement of internal partitions 36 towards second plate 32. Conversely, a change in temperature in the opposite direction (e.g., a decrease in temperature adjacent second plate 32 and/or an increase in temperature adjacent first plate 30) may automatically cause self-regulating thermal insulation 115 to transition towards the first configuration (FIG. 3), such that thermal actuators 38 expand and internal partitions 36 move towards first plate 30.

Such changing of distance 58 between respective adjacent internal partitions 36 and changing of gap length 64 may change the thermal resistance of self-regulating thermal insulation 115, such as by altering the natural convection conditions within self-regulating thermal insulation 115. For example, in the first configuration (FIG. 3), self-regulating thermal insulation 115 may be configured such that substantially no natural convection occurs between adjacent internal partitions 36, between first plate 30 and fifth internal partition 117, and/or between second plate 32 and first internal partition 50 (e.g., distance 58 and gap length 64 may each be small enough that natural convection is substantially prevented). By contrast, in the second configuration (FIG. 4), gap length 64 may be increased to a sufficient enough length that natural convection may occur between first plate 30 and fifth internal partition 117. In some examples, self-regulating thermal insulation 115 may be configured such that a stagnant air barrier is formed between respective adjacent pairs of internal partitions 36.

Each thermal actuator 38 may have a respective actuator height 118, which may be the vertical distance between first actuator end 54 and second actuator end 52. Actuator height 118 may vary between a minimum height (FIG. 4) and a maximum height (FIG. 3), with changes in actuator height 118 being caused by temperature changes adjacent self-regulating thermal insulation 115. In the example of FIGS. 3-4, actuator height 118 may be approximately equal to distance 58, because respective first actuator ends 54 and respective second actuator ends 52 are coupled to components (e.g., second plate 32 or a respective internal partition 36) of self-regulating thermal insulation 115. In the example of FIGS. 3-4, actuator height 118 may increase towards the maximum height (e.g., thermal actuator 38 may expand) in response to a decrease in temperature adjacent second plate 32 and/or in response to an increase in temperature adjacent first plate 30. Similarly, actuator height 118 may decrease towards the minimum height (e.g., thermal actuator 38 may contract) in response to an increase in temperature adjacent second plate 32 and/or in response to a decrease in temperature adjacent first plate 30. The maximum actuator height 118 of each thermal actuator 38 may be less than a distance associated with a critical Rayleigh number of self-regulating thermal insulation 115, in which thermal actuators 38 are positioned.

Figure 5:
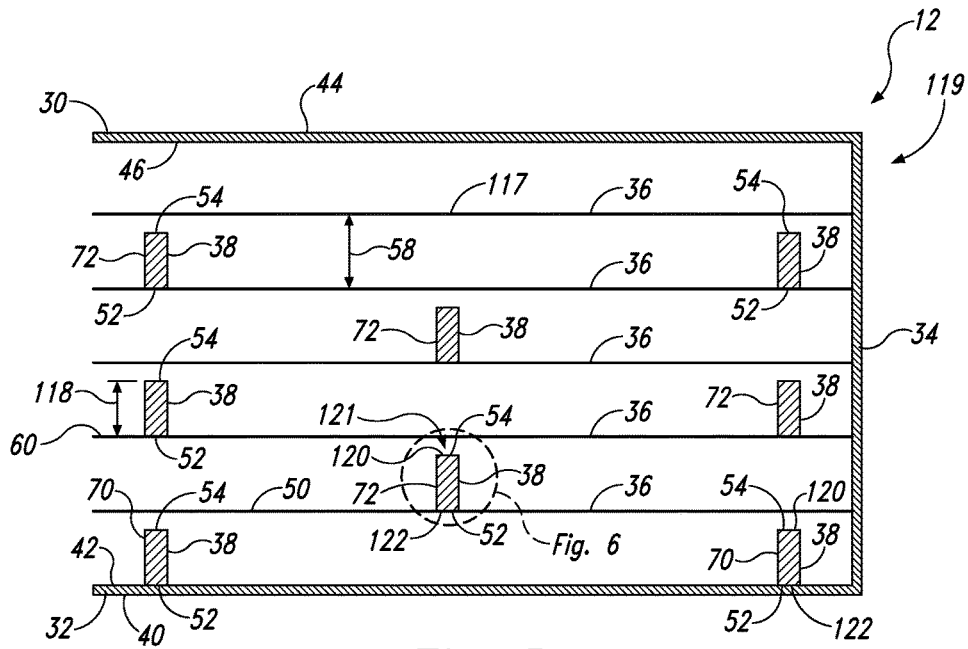
FIG. 5 is a schematic, cross-sectional view of another example of self-regulating thermal insulation according to the present disclosure, in a first configuration.
Figure 6:
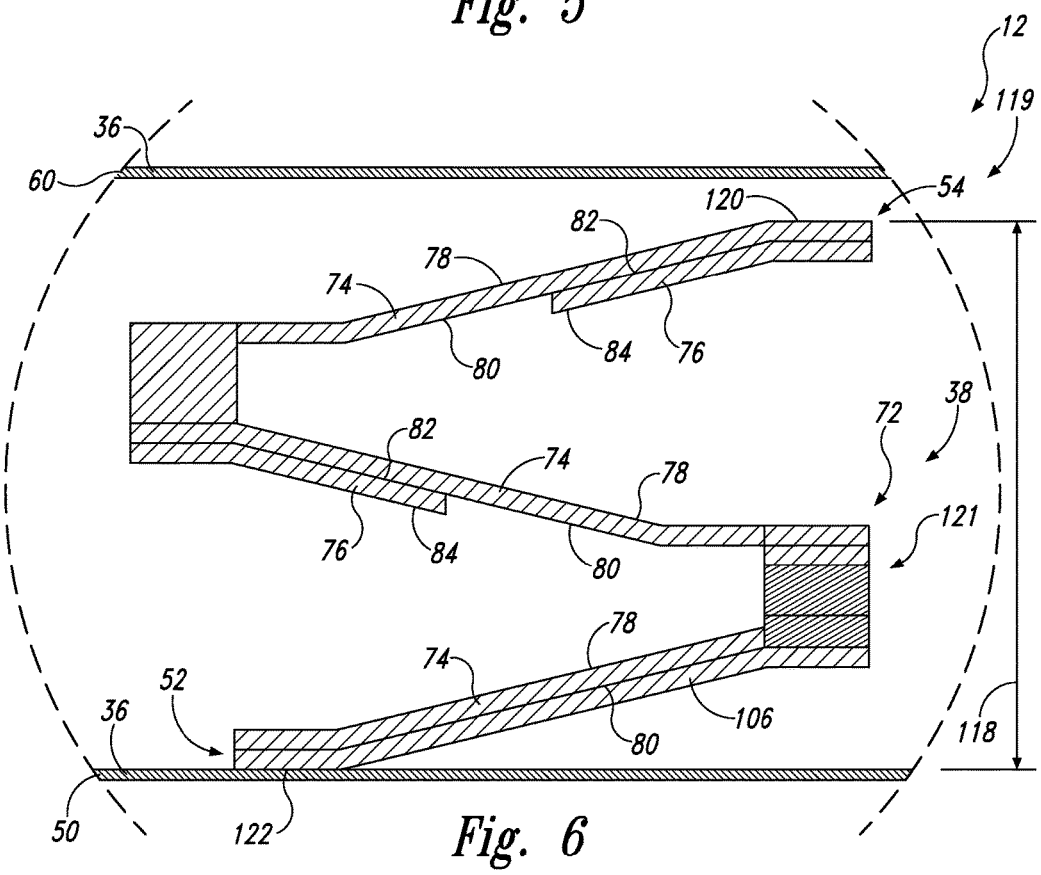
FIG. 6 is a less schematic, side cross-section view of a portion of the self-regulating thermal insulation of FIG. 5, including one thermal actuator.
Figure 7:
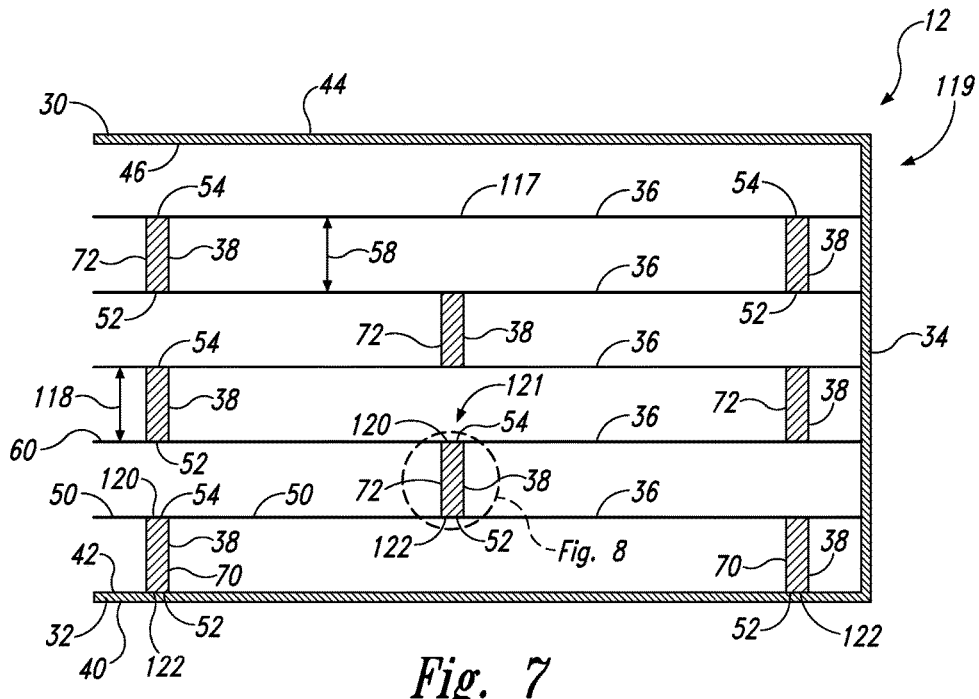
FIG. 7 is a schematic, cross-sectional view of the self-regulating thermal insulation of FIG. 5, in a second configuration.
Figure 8:
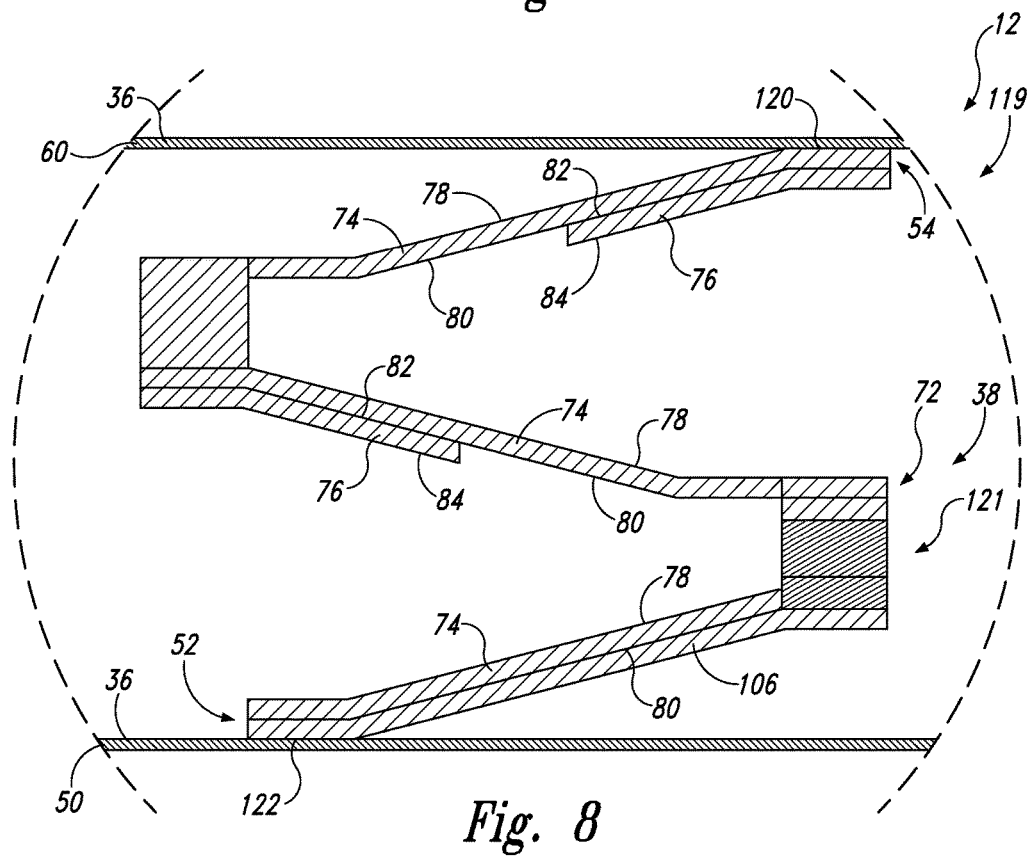
FIG. 8 is a less schematic, side cross-section view of a portion of the self-regulating thermal insulation of FIG. 7, including one thermal actuator.

FIGS. 5-8 are schematic cross-sectional views of a self-regulating thermal insulation 119, which is a second example of self-regulating thermal insulation 12, in a first configuration (FIGS. 5-6) and a second configuration (FIGS. 7-8). FIG. 6 illustrates a close-up of a thermal actuator 121, which is an example of thermal actuator 38, as positioned in self-regulating thermal insulation 119 of FIG. 5, in the first configuration. FIG. 8 illustrates a close-up of thermal actuator 121, as positioned in self-regulating thermal insulation 119 of FIG. 7, in the second configuration. Similar to the example of FIGS. 3-4, self-regulating thermal insulation 119 includes first plate 30, second plate 32, support structure 34, five internal partitions 36 positioned between first plate 30 and second plate 32, and a plurality of thermal actuators 38 (some or all of which may be thermal actuators 121, or any other example of thermal actuator disclosed herein) between respective adjacent internal partitions 36 (or between second plate 32 and first internal partition 50). By contrast to the example of FIGS. 3-4, respective thermal actuators 38 in self-regulating thermal insulation 119 are only coupled at their respective second actuator ends 52, and their respective first actuator ends 54 do not contact a respective internal partition 36 in the first configuration (FIGS. 5-6). In further contrast to the example of FIGS. 3-4, internal partitions 36 of self-regulating thermal insulation 119 are coupled to support structure 34, and are substantially stationary with respect to first plate 30, second plate 32, and support structure 34.

Self-regulating thermal insulation 119 of FIGS. 5-8 may be configured such that thermal actuators 38 expand (e.g., actuator height 118 increases) in response to an increase in temperature adjacent second plate 32 thereby reducing the thermal resistance of self-regulating thermal insulation 119, and contract (e.g., actuator height 118 decreases) in response to a decrease in temperature adjacent second plate 32, thereby increasing the thermal resistance of self-regulating thermal insulation 119. As shown in FIGS. 7-8, in the second configuration, thermal actuators 38 may contact a respective internal partition 36 adjacent first actuator end 54, thereby conducting heat between the respective layers of self-regulating thermal insulation 119 via that contact. By contrast, in the first configuration (FIGS. 5-6), self-regulating thermal insulation 119 may be configured such that thermal actuators 38 do not contact a respective internal partition 36 adjacent first actuator end 54 and such that substantially no thermal conduction occurs between adjacent respective internal partitions 36, or between second plate 32 and first internal partition 50. Thus, self-regulating thermal insulation 119 may be configured such that the thermal conductance of self-regulating thermal insulation 119 automatically changes in response to a change in temperature adjacent first outer surface 44 of first plate 30 and/or a temperature change adjacent second outer surface 40 of second plate 32.

Thermal actuators 38 may have a first contact surface 120 adjacent first actuator end 54, and a second contact surface 122 adjacent second actuator end 52. Each thermal actuator 38 may be coupled to a respective structure of self-regulating thermal insulation 119 at second contact surface 122, such as to second inner surface 42 of second plate 32, or to a respective internal partition 36. First contact surface 120 may be free from contact when thermal actuators 38 are contracted (e.g., in the first configuration), as shown in FIGS. 5-6, and may contact a respective internal partition 36 when thermal actuators 38 expand, such as shown in FIGS. 7-8. By contrast, in self-regulating thermal insulation 115 of FIGS. 3-4, thermal actuators 38 may be coupled at both first contact surface 120 and second contact surface 122 (e.g., each respective first contact surface 120 may be coupled to a respective internal partition 36, and each respective second contact surface 122 may be coupled to second plate 32 or to a respective internal partition 36).

As best seen in FIGS. 5 and 7, self-regulating thermal insulation 119 may include a plurality of thermal actuators 38, which may include a plurality of base actuators 70 and a plurality of internal actuators 72. Self-regulating thermal insulation 119 may include more or fewer base actuators 70 and/or internal actuators 72 than shown in the figures. Second contact surfaces 122 of each respective base actuator 70 may be coupled to second inner surface 42 of second plate 32, while second contact surfaces 122 of each respective internal actuator 72 may be coupled to a respective internal partition 36. Self-regulating thermal insulation 12 (e.g., self-regulating thermal insulation 115 of FIGS. 3-4 or self-regulating thermal insulation 119 of FIGS. 5-8) may include a plurality of types of thermal actuators 38, such as some as shown in FIGS. 3-4 (e.g., with both actuator ends coupled to a portion of the insulation) and some as shown in FIGS. 5-8 (with first actuator end 54 not coupled to a portion of the insulation), and/or any other examples of thermal actuators disclosed herein.

Figure 9:
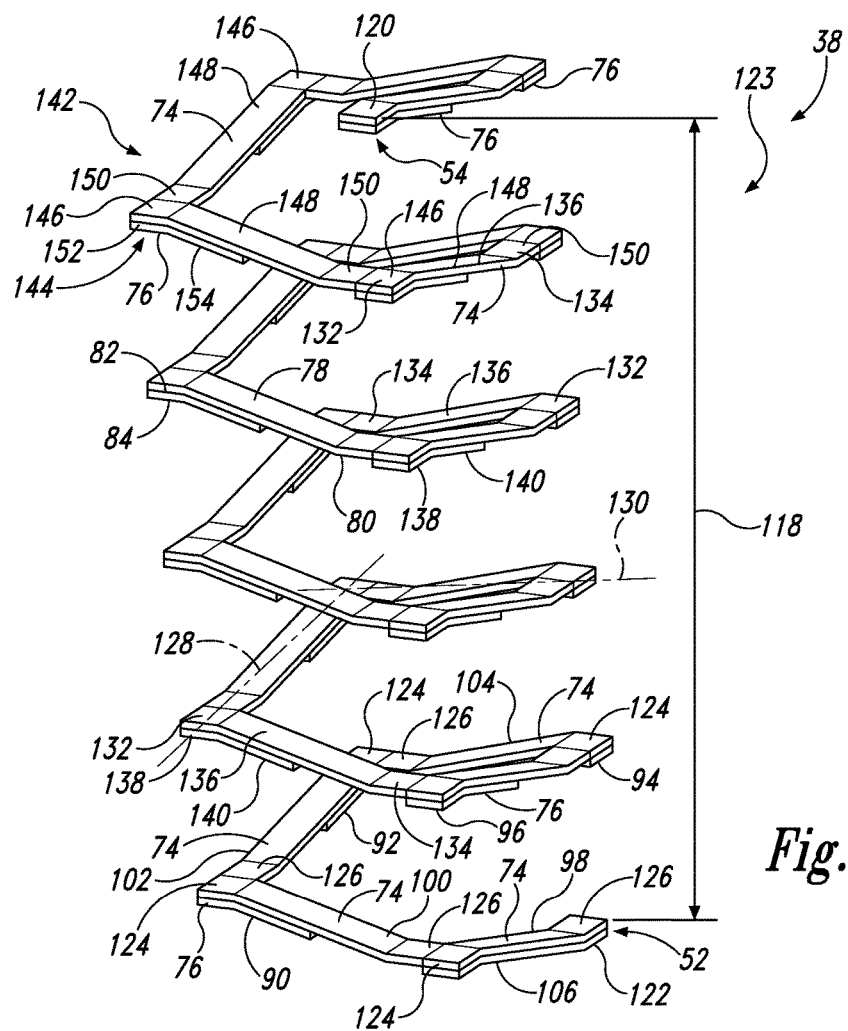
FIG. 9 is a perspective view of one example of a thermal actuator according to the present disclosure.

FIG. 9 illustrates another thermal actuator 123, which is an example of thermal actuator 38, having a plurality of first segments 74, a plurality of second segments 76, and forming a linear coil shape. The respective first segment 74 adjacent second actuator end 52 (e.g., first first segment 98) may have base segment 106 coupled thereto, whereas the other respective first segments 74 each have a respective second segment 76 coupled thereto. For example, second first segment 100 may have first second segment 90 coupled thereto, third first segment 102 may have second second segment 92 coupled thereto, fourth first segment 104 may have third second segment 94 coupled thereto, and so on. Each second segment 76 may have a length that is less than the length of each respective first segment 74, whereas the length of base segment 106 may be approximately equal to the length of first segment 74, but base segment 106 may be formed of the same material as second segments 76. Actuator height 118 may be the vertical distance between first actuator end 54 and second actuator end 52, and may change as thermal actuator 123 expands and contracts in reaction to changes in temperature adjacent thermal actuator 123. For example, actuator height 118 may increase when thermal actuator 123 expands, and actuator height 118 may decrease when thermal actuator 123 contracts.

Thermal actuator 123 of FIG. 9 includes a plurality of first segments 74, which may be integrally formed together, or may be coupled to one another to form a contiguous layer of the first material. In examples where a plurality of first segments 74 are coupled together, each respective first segment 74 may have a first segment end 124 and a second segment end 126 opposite first segment end 124. The plurality of first segments 74 may be arranged with respect to one another such that respective adjacent first segments 74 are coupled together adjacent a respective first segment end 124 and second segment end 126. For example, first segment end 124 of first first segment 98 may be coupled to second segment end 126 of second first segment 100, first segment end 124 of second first segment 100 may be coupled to second segment end 126 of third first segment 102, and so on. In some examples, respective longitudinal axes of respective adjacent first segments 74 may be substantially perpendicular to one another. For example, a first longitudinal axis 128 may be substantially perpendicular to a second longitudinal axis 130 of a respective adjacent first segment 74. Each first segment 74 may be substantially longitudinally extending, as shown in FIG. 9 (e.g., the length of each first segment 74 may be significantly greater than the width and height of the first segment).

Each first segment 74 has first upper surface 78 and first lower surface 80, with first upper surface 78 generally facing first actuator end 54, and first lower surface 80 generally facing second actuator end 52. Each second segment 76 has second upper surface 82, which is coupled to a respective first lower surface 80 of a respective first segment 74 or portion thereof. Opposite second upper surface 82, each second segment 76 has second lower surface 84, generally facing second actuator end 52.

Thermal actuator 123 may include first contact surface 120 adjacent first actuator end 54 and second contact surface 122 adjacent second actuator end 52. First contact surface 120 of thermal actuator 123 may be configured to be coupled to a first reference surface, which may be an internal partition (e.g., internal partition 36) of a self-regulating thermal insulation (e.g., self-regulating thermal insulation 12). In some examples, first contact surface 120 may be configured to be intermittently in contact with a first reference surface, such as an internal partition of a self-regulating thermal insulation (such as shown in FIGS. 5-8). First contact surface 120 may generally be a portion of first upper surface 78 of the respective first segment 74 adjacent first actuator end 54. Second contact surface 122 may be configured to be coupled to a second reference surface, which may be an internal partition or a second plate (e.g., second plate 32) of a self-regulating thermal insulation. Second contact surface 122 may generally be a portion of second lower surface 84 of the respective second segment 76 adjacent second actuator end 54, may be a portion of first lower surface 80 of the respective first segment 74 adjacent second actuator end 54, or, as shown in FIG. 9, may be a portion of base segment 106.

As shown in FIG. 9, first segments 74 and second segments 76 may be bent or angled at various points along the length of the segments. For example, each first segment 74 may take a jointed, elongated form, with a first substantially flat portion 132, a second substantially flat portion 134, and an angled portion 136 extending between first substantially flat portion 132 and second substantially flat portion 134. First substantially flat portion 132 and second substantially flat portion 134 may be substantially parallel to each other. Angled portion 136 may be configured to intersect first substantially flat portion 132 at a non-zero angle, as shown in FIG. 9. Similarly, each second segment 76 may include a horizontally-oriented portion 138 and a ramped portion 140 extending from horizontally-oriented portion 138. Each second segment 76 may be positioned with respect to a respective first segment 74 such that each respective horizontally-oriented portion 138 is positioned adjacent a respective first substantially flat portion 132 of a respective first segment 74, and such that each respective ramped portion 140 is positioned adjacent a respective angled portion 136 of the respective first segment 74. As discussed, the length of each second segment 76 may be less than the length of each first segment 74, and thus, ramped portion 140 may extend along only a portion of the length of the respective angled portion 136 adjacent which it is positioned. On the other hand, as shown in FIG. 9, each respective first segment 74 and second segment 76 may have substantially equal widths.

First upper surface 78 may form a first planar surface, and first lower surface 80 may form a second planar surface. Overall, each first segment 74 may form a respective first polyhedron 142, and each second segment 76 may form a respective second polyhedron 144. In some examples, each respective first polyhedron 142 may include a first rectangular prism 146, a second rectangular prism 148, and a third rectangular prism 150, all formed integrally together. Each respective first rectangular prism 146 may correspond to a respective first substantially flat portion 132, each respective second rectangular prism 148 may correspond to a respective angled portion 136, and each respective third rectangular prism 150 may correspond to a respective second substantially flat portion 134 of a respective first segment 74. Similarly, each respective second polyhedron 144 may include a fourth rectangular prism 152 and a fifth rectangular prism 154 that are formed integrally together, where each respective fourth rectangular prism 152 may correspond to a respective horizontally-oriented portion 138 and each respective fifth rectangular prism 154 may correspond to a respective ramped portion 140 of a respective second segment 76.

Figure 10:
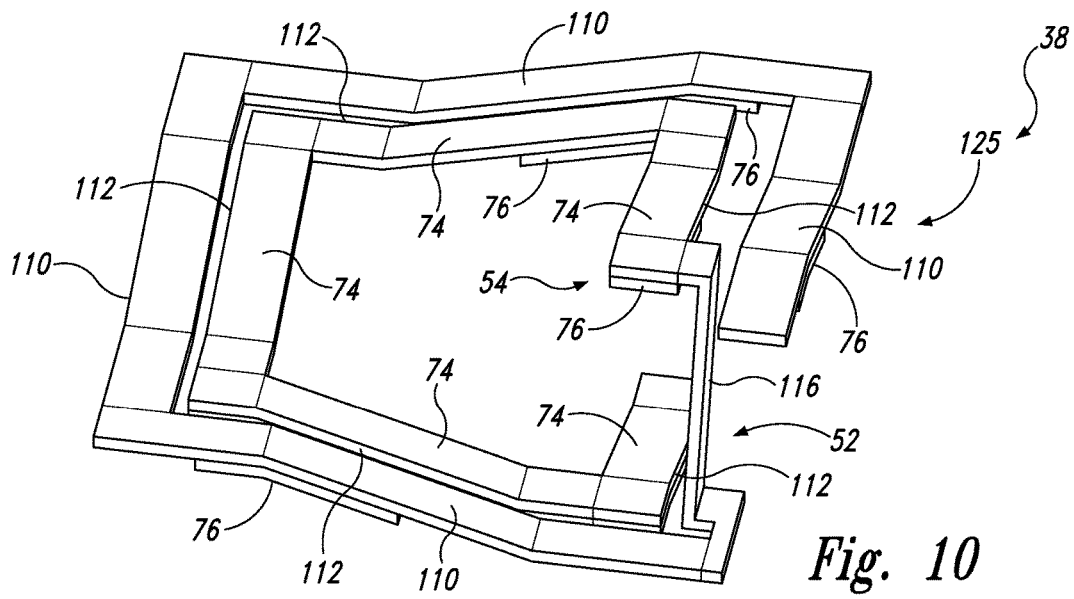
FIG. 10 is a perspective view of another example of a thermal actuator according to the present disclosure.

FIG. 10 illustrates a thermal actuator 125, which is an example of thermal actuator 38. As compared to thermal actuator 123 of FIG. 9, thermal actuator 125 of FIG. 10 includes fewer total segments (e.g., fewer first segments 74 and fewer second segments 76), and forms a three-dimensional nested shape. Thermal actuator 125 includes a plurality of first segments 74, arranged in a similar manner as first segments 74 in thermal actuator 123 of FIG. 9. However, rather than continuing the linear spiral in the same manner as shown in FIG. 9, thermal actuator 125 of FIG. 10 includes a plurality of outer segments 110 arranged around outer edges 112 of first segments 74, thereby forming the three-dimensional nested shape. Each outer segment 110 may have a respective second segment 76 coupled thereto, in a similar fashion as the respective second segments 76 coupled to first segments 74. In order to fit around the peripheral outer edges 112 of first segments 74, outer segments 110 may be longer than first segments 74. In some examples, second segments 76 may be substantially the same length whether they are coupled to a respective first segment 74 or to a respective outer segment 110. In other examples, respective second segments 76 coupled to outer segments 110 may be longer than respective second segments 76 coupled to first segments 74. Thermal actuator 125 may have more or fewer first segments 74, more or fewer outer segments 110, and/or more or fewer transition segments 116 in various embodiments, than shown in FIG. 10.

Thermal actuator 125 includes transition segment 116, which couples the respective first segment 74 most adjacent first actuator end 54 to the respective outer segment 110 most adjacent second actuator end 52. Due at least in part to transition segment 116 and the nested arrangement of thermal actuator 125, thermal actuator 125 may be configured to expand and contract through a proportionately greater range of heights for a given number of segments or for a given minimum actuator height.

Figure 11:
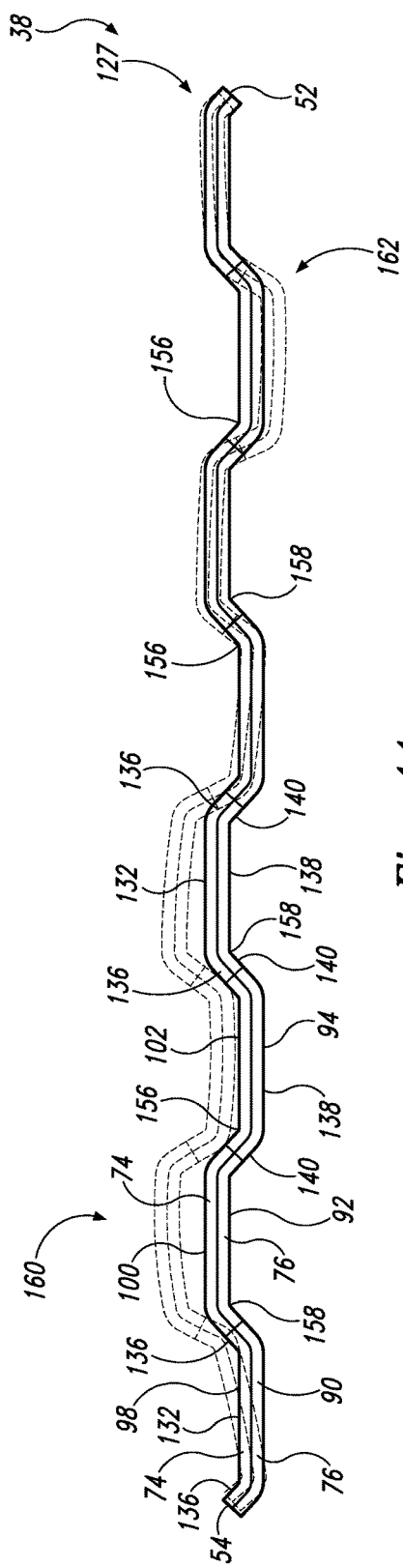
FIG. 11 is a schematic, elevation view of another example of a thermal actuator according to the present disclosure.

FIG. 11 illustrates a thermal actuator 127, which is yet another example of thermal actuator 38. Similar to the other examples of thermal actuators disclosed herein, thermal actuator 127 may be formed of a plurality of first segments 74 and a plurality of second segments 76 of different materials having different thermal expansion coefficients. In thermal actuator 127, the plurality of first segments 74 may be formed individually and then coupled or fused together to form a contiguous layer, or a continuous first segment 74 may be bent at a plurality of locations 156 to effectively form the plurality of first segments 74. Similarly, the plurality of second segments 76 may be formed individually and then coupled or fused together, or a continuous second segment 76 may be bent at a plurality of locations 158 to effectively form the plurality of second segments 76. While other examples of thermal actuators 38 described herein include second segments 76 that are spaced apart from one another, thermal actuator 127 may include a plurality of second segments 76 that are coupled together, to form a contiguous layer of second segments 76, or may be formed from a continuous second segment 76.

Thermal actuator 127 may be fixed (e.g., coupled to a respective reference surface) at both first actuator end 54 and second actuator end 52. In some examples, thermal actuator 127 may be substantially horizontally oriented when incorporated into a self-regulating thermal insulation of the present disclosure. Thermal actuator 127 may be configured to transition from a first configuration (indicated in solid line in FIG. 11) to a second configuration (indicated in dashed line in FIG. 11), in response to changes in temperature adjacent thermal actuator 127. For example, as shown in FIG. 11, in response to a change in temperature, thermal actuator 127 may automatically move such that a first portion 160 moves in a first direction (e.g., "upward" in FIG. 11), and a second portion 162 moves in a second direction (e.g., "downward" in FIG. 11), while remaining fixed at first actuator end 54 and second actuator end 52. Thermal actuator 127 may be configured to move in various ways in response to various temperature changes, depending on the materials selected for first segment 74 and second segment 76.

As shown in FIG. 11, thermal actuator 127 generally may have a three-dimensional sinusoidal shape, due to the bends in first segment 74 and second segment 76. In some examples, thermal actuator 127 may take an overall generally sinusoidal, S-shaped, curvilinear, bent, oscillating, undulating, and/or zigzag shape. Each respective first segment 74 may have a substantially flat portion 132 extending between two respective angled portions 136 positioned on opposite ends of substantially flat portion 132. Similarly, each respective second segment 76 may have a horizontally-oriented portion 138 extending between two respective ramped portions 140 positioned on opposite ends of horizontally-oriented portion 138. Each respective first segment 74 may be positioned with respect to a respective second segment 76 such that the respective substantially flat portion 132 is coupled to the respective horizontally-oriented portion 138, and such that each respective angled portion 136 is coupled to a respective ramped portion 140. As shown in FIG. 11, adjacent first segments 74 may be oriented at approximately 180 degrees with respect to one another. For example, first first segment 98 may be oriented with angled portions 136 facing upwards, second first segment 100 may be oriented with angled portions 136 facing downwards, third first segment 102 may be oriented with angled portions 136 facing upwards, and so on. Similarly, adjacent second segments 76 may be oriented at approximately 180 degrees with respect to one another. For example, first second segment 90 may be oriented with ramped portions 140 facing upwards, second second segment 92 may be oriented with ramped portions 140 facing downwards, third second segment 94 may be oriented with ramped portions 140 facing upwards, and so on. Other configurations are also possible and within the scope of the present disclosure.

Figure 12:
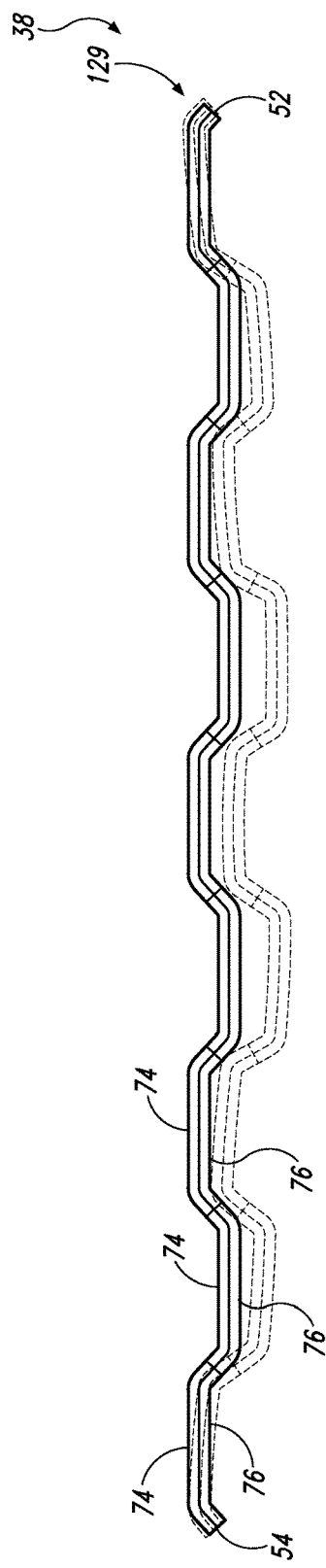
FIG. 12 is a schematic, elevation view of another example of a thermal actuator according to the present disclosure.

FIG. 12 illustrates a thermal actuator 129, which is another example of thermal actuator 38. Thermal actuator 129 of FIG. 12, is similar to thermal actuator 127 of FIG. 11, except that thermal actuator 129 has an odd number of first segments 74 and second segments 76 (nine of each, as shown in FIG. 12), whereas thermal actuator 127 of FIG. 11 has an even number of first segments 74 and second segments 76 (eight of each, as shown in FIG. 11). Thermal actuator 129 is otherwise similar to thermal actuator 127, but due to the different configuration, responds differently to changes in temperature adjacent the thermal actuator. For example, while thermal actuator 127 moves in response to temperature changes such that one side moves in the opposite direction from the other side, thermal actuator 129 generally moves in a single direction. For example, as shown in FIG. 12 in dashed line, thermal actuator 129 may move downward with respect to its fixed ends (e.g., first actuator end 54 and second actuator end 52), in response to a change in temperature. Depending on the respective materials used for first segment 74 and second segment 76, such downward movement as indicated in FIG. 12 may be in response to either a decrease in temperature adjacent thermal actuator 129, or an increase in temperature adjacent thermal actuator 129. Thermal actuator 129 may generally move in the opposite direction (e.g., upwards with respect to the fixed ends), in response to a change in temperature in the opposite direction. For example, if thermal actuator 129 is configured to move generally downward in response to a decrease in temperature, it may move generally upward in response to an increase in temperature.

Figure 13:
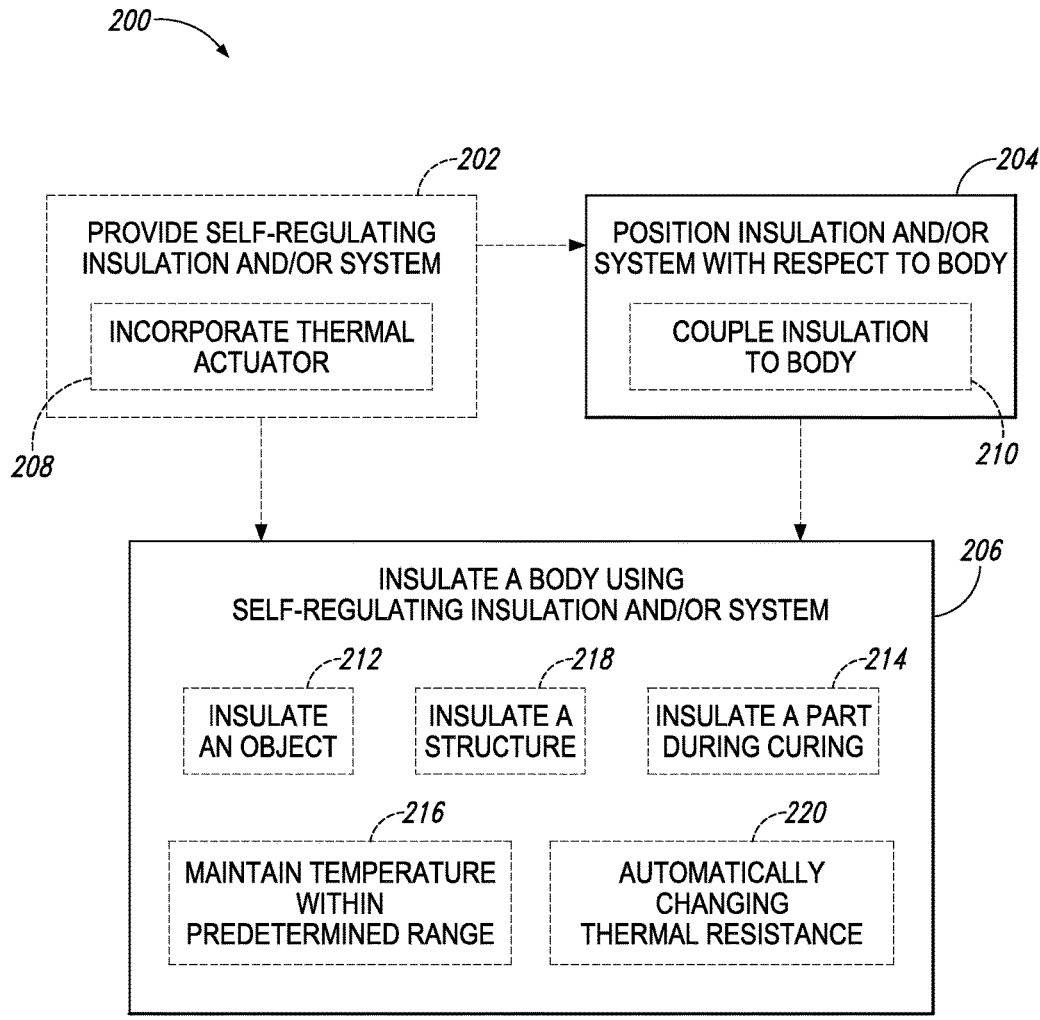
FIG. 13 is a schematic, flow chart diagram, representing methods according to the present disclosure.
Figure 14:
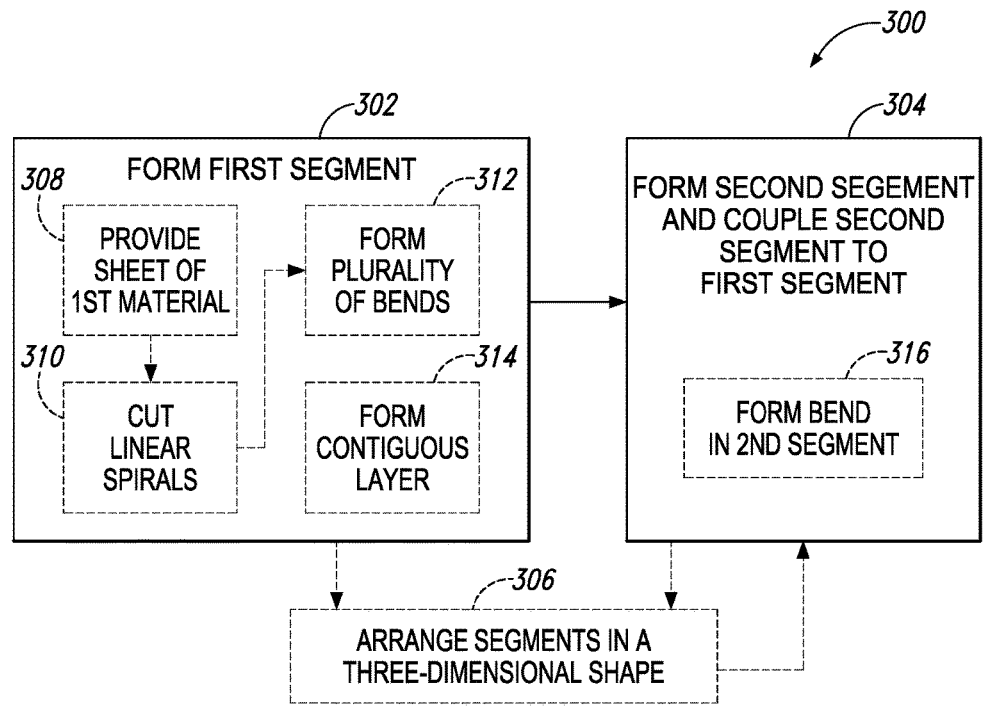
FIG. 14 is a schematic, flow chart diagram, representing methods of making a thermal actuator according to the present disclosure.
Figure 15:
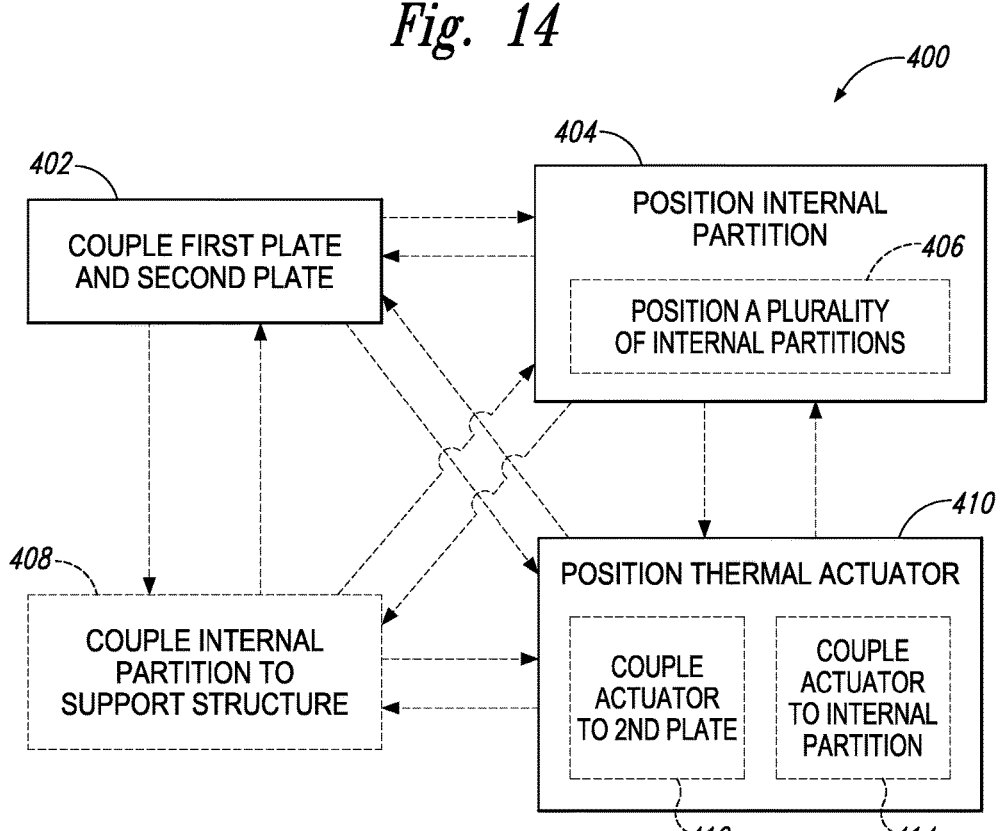
FIG. 15 is a schematic, flow chart diagram, representing methods of making self-regulating thermal insulation according to the present disclosure.

FIGS. 13-15 schematically provide flowcharts that represent illustrative, non-exclusive examples of methods according to the present disclosure. In FIGS. 13-15, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 13-15 are not limiting and other methods and steps are within the scope of the present disclosure, including methods having greater than or fewer than the number of steps illustrated, as understood from the discussions herein.

FIG. 13 illustrates methods 200 according to the present disclosure. Methods 200 may generally include providing a self-regulating thermal insulation (e.g., self-regulating thermal insulation 12) and/or a self-regulating thermal insulation system (e.g., self-regulating thermal insulation system 10) at 202, positioning the self-regulating thermal insulation and/or the self-regulating thermal insulation system with respect to a body (e.g., body 14) at 204, and insulating the body using the self-regulating thermal insulation and/or the self-regulating thermal insulation system at 206. In some methods 200, providing the self-regulating thermal insulation at 202 may include making the self-regulating thermal insulation, making the self-regulating thermal insulation system, and/or making a thermal actuator (e.g., thermal actuator 38) for use with the self-regulating thermal insulation and/or the self-regulating thermal insulation system. In some methods 200, providing the self-regulating thermal insulation at 202 may include incorporating one or more thermal actuators within the self-regulating thermal insulation and/or the self-regulating thermal insulation system at 208, thereby using the thermal actuator to form a portion of the self-regulating thermal insulation and/or self-regulating thermal insulation system. For example, the self-regulating thermal insulation and the thermal actuators may be manufactured at different times and/or different locations, and combined before using the insulation in some methods.

Positioning the insulation with respect to the body at 204 may include coupling the self-regulating thermal insulation and/or the self-regulating thermal insulation system to the body at 210. In other methods 200, positioning the insulation with respect to the body at 204 may include placing the self-regulating insulation and/or the self-regulating thermal insulation system on or over some or all of the body, wrapping or enveloping some or all of the body with the self-regulating thermal insulation, and/or installing and/or using the self-regulating thermal insulation in an enclosure, such as a building or vehicle. In some specific methods 200, positioning the self-regulating thermal insulation at 204 may include positioning the self-regulating thermal insulation with respect to the body such that an outer surface of the insulation (e.g., second outer surface 40 of second plate 32 of self-regulating thermal insulation 12) faces the body, and/or positioning the self-regulating thermal insulation system such that an outer surface of the system (e.g., an outer surface of a blanket or other material that includes a plurality of pieces of self-regulating thermal insulation) faces the body.

Insulating the body using the self-regulating thermal insulation and/or the self-regulating thermal insulation system at 206 may include insulating any body, such as insulating an object or a portion thereof at 212. In some methods, insulating the object or a portion thereof at 212 may include insulating the object or the portion of the object during a manufacturing process and/or a thermal process. In some methods, insulating the body at 206 may include insulating a part, such as at least a portion of a composite part, during curing at 214. Additionally or alternatively, insulating the body at 206 may include maintaining a temperature of at least a portion of the body within a predetermined range for a predetermined period of time, at 216. Insulating the body at 206 may include automatically changing a thermal resistance at 220, such as automatically changing a thermal resistance of the self-regulating thermal insulation and/or self-regulating thermal insulation system, without human intervention, a power source, or a feedback control system.

In some methods 200, insulating the body at 206 may including insulating a structure (e.g., a dwelling, building, or other structure) at 218. In other methods, the body may be a living being, such as using the self-regulating thermal insulation and/or self-regulating thermal insulation system (e.g., a blanket with a plurality of pieces of self-regulating insulation encased therein) to insulate a person or animal.

FIG. 14 illustrates methods 300 of making a thermal actuator (e.g., thermal actuator 38), which generally may include forming one or more first segments (e.g., one or more first segments 74) at 302, forming and coupling one or more second segments (e.g., one or more second segments 76) to the one or more first segments at 304, and/or arranging the segments in a three-dimensional shape at 306. To form the one or more first segments at 302, a sheet of first material having a first thermal expansion coefficient may be provided at 308, in some methods 300. One or more linear spirals (or any other shape) may be cut in the sheet of first material at 310, and then a plurality of bends may be formed in the linear spiral at 312, in order to form the first segment or effective plurality of first segments. For example, the first segment may be bent at 312 in order to form a first substantially flat portion (e.g., first substantially flat portion 132 adjacent first segment end 124), a second substantially flat portion (e.g., second substantially flat portion 134 adjacent second segment end 126), and an angled portion (e.g., angled portion 136) extending therebetween. The first segment may be bent, shaped, or otherwise formed at 312 a plurality of times, in order to form the desired three-dimensional shape and/or to effectively form a plurality of first segments (e.g., by forming a plurality of angled portions between a plurality of respective pairs of substantially flat portions). In some such methods, the first segment may be one continuous layer (e.g., continuously cut from the sheet of material, or otherwise formed or extruded as a continuous layer). In other methods, the first segment may be formed by coupling together a plurality of first segments to form a contiguous layer, at 314, such as by welding, soldering, and/or brazing respective first segments together.

Coupling one or more second segments to the first segment at 304 may include forming one or more second segments from a second material having a second thermal expansion coefficient (which is different than the first thermal expansion coefficient), and coupling at least one second segment to a first lower surface of the first segment (e.g., first lower surface 80 of first segment 74), such as by welding, soldering, brazing, plasma spraying, electrochemical depositing, and/or diffusion bonding the second segment (e.g., a second upper surface 82 of the second segment) with respect to the first lower surface of the first segment. Coupling one or more second segments to the first segment at 304 may include coupling a plurality of second segments to the first lower surface of the first segment of the actuator. The length of each respective second segment may be less than the length of each respective first segment, and each respective second segment may be coupled to the first segments such that each second segment is spaced apart from the other respective second segments. One or more bends may be formed in each respective second segment at 316, such as to form a horizontally-oriented portion (e.g., horizontally-oriented portion 138) and a ramped portion (e.g., ramped portion 140). The coupled segments may be arranged in a three-dimensional shape at 306, such as a linear spiral, a nested shape, and/or a generally sinusoidal shape.

FIG. 15 illustrates methods 400 of making a self-regulating thermal insulation (e.g., self-regulating thermal insulation 12) and/or self-regulating thermal insulation system (e.g., self-regulating thermal insulation system 10). In methods 400, a first plate and a second plate (e.g., first plate 30 and second plate 32) may be coupled with respect to one another at 402. For example, coupling the first plate and the second plate at 402 may include coupling the plates to each other, such as by coupling the first plate and the second plate to a support structure (e.g., support structure 34). The first plate and the second plate may be coupled with respect to one another at 402 such that the first plate is separated from the second plate by an insulation thickness, which may remain substantially constant.

An internal partition (e.g., internal partition 36) may be positioned between the first plate and the second plate at 404. In some methods, positioning the internal partition at 404 may include positioning a plurality of internal partitions at 406, such that adjacent respective internal partitions are spaced apart between the first plate and the second plate. In some methods 400, the internal partition (or the plurality of internal partitions) may be coupled to the support structure at 408. In other methods, the internal partition(s) are not coupled to the support structure, such as in making a self-regulating thermal insulation or self-regulating thermal insulation system where the internal partitions are configured to move with respect to the first plate and the second plate. In some methods 400, positioning the internal partitions at 404 may include positioning at least one internal partition that is coupled to the support structure at 408 and positioning at least one internal partition that is not coupled to the support structure.

Methods 400 may include positioning one or more thermal actuators (e.g., thermal actuator 38) of one or more different types disclosed herein between the second plate and the first plate of the self-regulating thermal insulation and/or self-regulating thermal insulation system at 410, such that the thermal actuator is configured to automatically effectuate a change in the thermal resistance of the self-regulating thermal insulation and/or self-regulating thermal insulation system, in response to a change in a temperature adjacent the same. For example, positioning one or more thermal actuators at 410 may include positioning one or more thermal actuators such that at least one thermal actuator intermittently contacts an internal partition of the self-regulating thermal insulation and/or self-regulating thermal insulation system, in response to a change in temperature adjacent the same, in order to change the insulation's or system's thermal resistance. Additionally or alternatively, positioning one or more thermal actuators at 410 may include positioning one or more thermal actuators such that at least one thermal actuator moves an internal partition of the self-regulating thermal insulation and/or self-regulating thermal insulation system with respect to the first plate and second plate, in response to a change in temperature adjacent the insulation and/or system. Similarly, positioning one or more thermal actuators at 410 may include positioning one or more respective thermal actuators that are configured to actuate (e.g., expand and contract) in response to a different range of temperatures than other one or more respective thermal actuators that are also positioned within the self-regulating thermal insulation and/or self-regulating thermal insulation system.

In some methods, positioning the thermal actuator at 410 may include positioning one or more thermal actuators between the second plate and an internal partition. Additionally or alternatively, positioning the thermal actuator at 410 may include positioning one or more thermal actuators between one or more respective pairs of adjacent internal partitions. In positioning the thermal actuators at 410, one or both ends (e.g., first actuator end 54 and/or second actuator end 52) may be coupled to a component of the self-regulating thermal insulation and/or self-regulating thermal insulation system. For example, one or more thermal actuators (e.g., one or more respective second actuator ends 52) may be coupled to the second plate of the self-regulating thermal insulation and/or self-regulating thermal insulation system at 412. Additionally or alternatively, one or more thermal actuators may be coupled to one or more internal partitions of the self-regulating thermal insulation and/or self-regulating thermal insulation system at 414. For example, for thermal actuators positioned between the second plate and an internal partition, the second actuator end of the thermal actuator may be coupled to the second plate at 412, and the first actuator end of the thermal actuator may be coupled to the internal partition at 414. For thermal actuators positioned between respective adjacent internal partitions, the first actuator end of the thermal actuator may be coupled to a first respective internal partition at 414, and the second actuator end of the thermal actuator may be coupled to a second respective internal partition, also at 414. Again, in some methods, one only actuator end is coupled to a reference surface, for some or all of the thermal actuators incorporated (e.g., positioned) within a self-regulating thermal insulation and/or self-regulating thermal insulation system.

The coupling the first plate and the second plate at 402 may include coupling the first plate to the support structure and/or coupling the second plate to the support structure via a rivet, an adhesive, a fastener, a weld, a solder joint, a braze joint, plasma spraying, electrochemical depositing, and/or diffusion bonding. Similarly, coupling the thermal actuator to the second plate at 412 and/or coupling the thermal actuator to the internal partition at 414 may include coupling one or both actuator ends of one or more thermal actuators, such as via a rivet, an adhesive, a fastener, a weld, a solder joint, a braze joint, plasma spraying, electrochemical depositing, and/or diffusion bonding.

Illustrative, non-exclusive examples of inventive subject matter according to the present disclosure are described in the following enumerated paragraphs:

A1. A thermal actuator, comprising:
a first segment comprising a first material having a first thermal expansion coefficient, the first segment having a first upper surface and a first lower surface opposite the first upper surface, the first segment being a contiguous layer and having a first length; and
a second segment comprising a second material having a second thermal expansion coefficient, the second thermal expansion coefficient being different from the first thermal expansion coefficient, the second segment having a second upper surface and a second lower surface opposite the second upper surface, wherein the second upper surface of the second segment is coupled to the first lower surface of the first segment, the second segment having a second length.

A1.1. The thermal actuator of paragraph A1, wherein the second length is less than the first length.

A1.2. The thermal actuator of paragraph A1 or A1.1, wherein the thermal actuator extends from a first actuator end to a second actuator end.

A1.3. The thermal actuator of any of paragraphs A1-A1.2, wherein the first upper surface is substantially parallel to the first lower surface.

A1.4. The thermal actuator of any of paragraphs A1-A1.3, wherein the first upper surface forms a first planar surface, and wherein the first lower surface forms a second planar surface.

A1.5. The thermal actuator of any of paragraphs A1-A1.4, wherein the first segment forms a first polyhedron.

A1.6. The thermal actuator of paragraph A1.5, wherein the first polyhedron comprises a first rectangular prism, a second rectangular prism, and a third rectangular prism, wherein the first rectangular prism, the second rectangular prism, and the third rectangular prism are formed integrally together.

A1.7. The thermal actuator of any of paragraphs A1-A1.5, wherein the second segment forms a second polyhedron.

A1.8. The thermal actuator of paragraph A1.7, wherein the second polyhedron comprises a fourth rectangular prism and a fifth rectangular prism, wherein the fourth rectangular prism and the fifth rectangular prism are formed integrally together.

A2. The thermal actuator of any of paragraphs A1-A1.8, wherein the second segment comprises a plurality of second segments spaced apart along the first lower surface of the first segment.

A3. The thermal actuator of any of paragraphs A1-A2, wherein the thermal actuator is configured to move in response to a change in a temperature of the thermal actuator.

A3.1. The thermal actuator of any of paragraphs A1-A3, wherein the thermal actuator is configured to automatically expand and contract in response to a respective change in a/the temperature of the thermal actuator.

A4. The thermal actuator of any of paragraphs A1-A3.1, wherein the thermal actuator is configured to expand such that a/the first actuator end and a/the second actuator end expand away from each other in response to an increase in a/the temperature of the thermal actuator.

A5. The thermal actuator of any of paragraphs A1-A4, wherein the thermal actuator is configured to contract such that a/the first actuator end and a/the second actuator end contract towards each other in response to a decrease in a/the temperature of the thermal actuator.

A6. The thermal actuator of any of paragraphs A1-A3.1, wherein the thermal actuator is configured to expand such that a/the first actuator end and a/the second actuator end expand away from each other in response to a decrease in a/the temperature of the thermal actuator.

A7. The thermal actuator of any of paragraphs A1-A3.1 or A6, wherein the thermal actuator is configured to contract such that a/the first actuator end and a/the second actuator end contract towards each other in response to an increase in a/the temperature of the thermal actuator.

A8. The thermal actuator of any of paragraphs A1-A7, wherein the first segment comprises a continuous layer.

A9. The thermal actuator of any of paragraphs A1-A8, wherein the first segment comprises a coil shape.

A10. The thermal actuator of any of paragraphs A1-A9, wherein the first segment comprises a linear spiral.

A11. The thermal actuator of any of paragraphs A1-A10, wherein the first segment comprises a plurality of first segments, the plurality of first segments forming the contiguous layer.

A11.1. The thermal actuator of paragraph A11, wherein the contiguous layer extends from a/the first actuator end to a/the second actuator end.

A12. The thermal actuator of paragraph A11, wherein each first segment of the plurality of first segments comprises a respective first segment end and a respective second segment end opposite the respective first segment end, and wherein the plurality of first segments are arranged with respect to one another such that the respective first segment end of one respective first segment is coupled to the respective second segment end of an adjacent respective first segment.

A13. The thermal actuator of any of paragraphs A11-A12, each of the plurality of first segments being coupled end to end to form the contiguous layer.

A14. The thermal actuator of any of paragraphs A11-A13, wherein each respective first segment of the plurality of first segments comprises a respective longitudinal axis extending from a/the respective first segment end to a/the respective second segment end, and wherein adjacent respective first segments are arranged with respect to one another such that the respective longitudinal axes of respective adjacent first segments are approximately perpendicular to one another.

A15. The thermal actuator of any of paragraphs A1-A14, wherein the first segment comprises a substantially longitudinally extending first segment.

A16. The thermal actuator of any of paragraphs A1-A15, wherein the thermal actuator forms a three-dimensional sinusoidal shape.

A17. The thermal actuator of any of paragraphs A1-A16, wherein the thermal actuator forms a three-dimensional nested shape.

A18. The thermal actuator of any of paragraphs A1-A17, comprising a first contact surface adjacent the first actuator end, the first contact surface being configured to be coupled to a first reference surface.

A18.1. The thermal actuator of any of paragraphs A1-A18, comprising a/the first contact surface adjacent the first actuator end, the first contact surface being configured to be at least intermittently in contact with a/the first reference surface.

A19. The thermal actuator of paragraph A18 or A18.1, wherein the first reference surface comprises an internal partition of a self-regulating insulation.

A19.1. The thermal actuator of any of paragraphs A18-A19, wherein the first contact surface is formed by a first portion of the first upper surface of the first segment.

A20. The thermal actuator of any of paragraphs A1-A19.1, comprising a second contact surface adjacent a/the second actuator end, the second contact surface being configured to be coupled to a second reference surface.

A21. The thermal actuator of paragraph A20, wherein the second reference surface comprises a second plate of a/the self-regulating insulation.

A22. The thermal actuator of paragraph A20 or A21, wherein the second reference surface comprises an/the internal partition of a/the self-regulating insulation.

A23. The thermal actuator of any of paragraphs A20-A22, wherein the second contact surface is formed by a second portion of the second lower surface of the second segment.

A24. The thermal actuator of any of paragraphs A20-A23, wherein the first segment comprises a first substantially flat portion, a second substantially flat portion, and an angled portion extending between the first substantially flat portion and the second substantially flat portion.

A24.1. The thermal actuator of paragraph A24, wherein the first substantially flat portion is arranged to be substantially parallel to the second substantially flat portion.

A24.2. The thermal actuator of paragraph A24.1, wherein the angled portion is configured to intersect the first substantially flat portion at a non-zero angle.

A25. The thermal actuator of any of paragraphs A20-A23, wherein the first segment comprises a first angled portion, a second angled portion, and a substantially flat portion extending between the first angled portion and the second angled portion.

A26. The thermal actuator of any of paragraphs A20-A25, wherein the second segment comprises a horizontally-oriented portion and a ramped portion.

A27. The thermal actuator of any of paragraphs A20-A25, wherein the second segment comprises a first ramped portion, a second ramped portion, and a horizontally-oriented portion extending between the first ramped portion and the second ramped portion.

A28. The thermal actuator of any of paragraphs A20-A27, wherein the second segment comprises a base segment and the thermal actuator further comprises a plurality of third segments, wherein the second length of the base segment is greater than a third length of each of the plurality of third segments.

A28.1. The thermal actuator of paragraph A28, wherein the second length of the base segment is substantially equal to the first length of the first segment.

A29. The thermal actuator of paragraphs A24 and A26, wherein the second segment is positioned with respect to the first segment such that the horizontally-oriented portion is positioned adjacent the first substantially flat portion and the ramped portion is positioned adjacent the angled portion.

A30. The thermal actuator of paragraph A29, wherein the ramped portion extends only a portion of a length of the angled portion.

A31. The thermal actuator of paragraph A29 or A30, wherein the second segment is positioned adjacent the first lower surface of the first segment.

A32. The thermal actuator of any of paragraphs A1-A31, wherein the first segment and the second segment have substantially equal widths.

A33. The thermal actuator of any of paragraphs A1-A32, wherein the entire second segment contacts the first segment.

A34. The thermal actuator of any of paragraphs A1-A33, wherein the first segment comprises a/the plurality of first segments, wherein the thermal actuator further comprises a plurality of outer segments arranged about an outer edge of the plurality of first segments, the plurality of outer segments comprising the first material, wherein the thermal actuator further comprises a transition segment configured to couple a respective one of the first segments of the plurality of first segments to a respective one of the outer segments of the plurality of outer segments.

A34.1. The thermal actuator of paragraph A34, wherein each of the outer segments of the plurality of outer segments has an outer segment length, the outer segment length being greater than the first length of each of the first segments of the plurality of first segments.

A34.2. The thermal actuator of paragraph A34-A34.1, wherein each respective outer segment of the plurality of outer segments comprises a respective second segment coupled thereto.

A35. The thermal actuator of any of paragraphs A1-A34.2, wherein the thermal actuator comprises a bi-metallic actuator.

A36. The thermal actuator of any of paragraphs A1-A35, wherein first material comprises a first metal.

A36.1. The thermal actuator of any of paragraphs A1-A36, wherein the first material comprises one or more of iron, aluminum, zinc, tungsten, titanium, steel, silver, platinum, palladium, nickel, manganese, carbon, gold, copper, bronze, and combinations thereof.

A37. The thermal actuator of any of paragraphs A1-A36.1, wherein the second material comprises a second metal, the second metal being different from the first material comprising a/the first metal.

A37.1. The thermal actuator of any of paragraphs A1-A37, wherein the second material comprises one or more of iron, aluminum, zinc, tungsten, titanium, steel, silver, platinum, palladium, nickel, manganese, carbon, gold, copper, bronze, and combinations thereof.

A38. The thermal actuator of any of paragraphs A1-A37.1, wherein the first thermal expansion coefficient is greater than the second thermal expansion coefficient.

A39. The thermal actuator of any of paragraphs A1-A37.1, wherein the second thermal expansion coefficient is greater than the first thermal expansion coefficient.

A40. The thermal actuator of any of paragraphs A1-A39, wherein the thermal actuator is positioned inside a self-regulating thermal insulation and is configured to automatically change the thermal resistance of the self-regulating thermal insulation.

A41. The thermal actuator of any of paragraphs A1-A40, wherein the thermal actuator is positioned inside a/the self-regulating thermal insulation and is configured to automatically change the convection conditions within the self-regulating thermal insulation.

A42. The thermal actuator of any of paragraphs A1-A41, wherein the thermal actuator is configured to expand at least 0.005 mm, at least 0.01 mm, at least 0.02 mm, at least 0.05 mm, at least 0.1 mm, at least 0.2 mm, at least 0.25 mm, at least 0.5 mm, and/or at least 1 mm in response to a change in temperature of the thermal actuator.

A42.1. The thermal actuator of any of paragraphs A1-A42, wherein the thermal actuator is configured to contract at least 0.005 mm, at least 0.01 mm, at least 0.02 mm, at least 0.05 mm, at least 0.1 mm, at least 0.2 mm, at least 0.25 mm, at least 0.5 mm, and/or at least 1 mm in response to a change in temperature of the thermal actuator.

A43. The thermal actuator of any of paragraphs A1-A42.1, wherein the first segment comprises at least 2 first segments, at least 3 first segments, at least 4 first segments, at least 5 first segments, at least 6 first segments, at least 7 first segments, at least 8 first segments, at least 9 first segments, at least 10 first segments, at least 12 first segments, at least 15 first segments, at least 20 first segments, at least 25 first segments, at least 30 first segments, and/or at least 50 first segments.

A43.1. The thermal actuator of any of paragraphs A1-A43, wherein the first segment comprises a first number of first segments, wherein the second segment comprises a second number of second segments, and wherein the first number equals the second number.

A44. The thermal actuator of any of paragraphs A1-A43.1, wherein the second segment comprises at least 2 second segments, at least 3 second segments, at least 4 second segments, at least 5 second segments, at least 6 second segments, at least 7 second segments, at least 8 second segments, at least 9 second segments, at least 10 second segments, at least 12 second segments, at least 15 second segments, at least 20 second segments, at least 25 second segments, at least 30 second segments, and/or at least 50 second segments.

A45. The thermal actuator of any of paragraphs A1-A44, wherein the first thermal expansion coefficient is at least 1.1 times the second thermal expansion coefficient, at least 1.25 times the second thermal expansion coefficient, at least 1.5 times the second thermal expansion coefficient, at least 1.75 times the second thermal expansion coefficient, at least 2 times the second thermal expansion coefficient, at least 3 times the second thermal expansion coefficient, and/or at least 5 times the second thermal expansion coefficient.

A46. The thermal actuator of any of paragraphs A1-A44, wherein the second thermal expansion coefficient is at least 1.1 times the first thermal expansion coefficient, at least 1.25 times the first thermal expansion coefficient, at least 1.5 times the first thermal expansion coefficient, at least 1.75 times the first thermal expansion coefficient, at least 2 times the first thermal expansion coefficient, at least 3 times the first thermal expansion coefficient, and/or at least 5 times the first thermal expansion coefficient.

A47. The thermal actuator of any of paragraphs A1-A46, wherein the thermal actuator has a height defined as the vertical distance between a/the first actuator end and a/the second actuator end, wherein the height varies between a minimum height and a maximum height, in response to the temperature of the thermal actuator.

A48. The thermal actuator of paragraph A47, wherein the height of the thermal actuator increases towards the maximum height in response to an increase in a/the temperature of the thermal actuator.

A49. The thermal actuator of paragraph A47, wherein the height of the thermal actuator decreases towards the minimum height in response to an increase in a/the temperature of the thermal actuator.

A50. The thermal actuator of paragraph A47 or A49, wherein the height of the thermal actuator increases towards the maximum height in response to a decrease in a/the temperature of the thermal actuator.

A51. The thermal actuator of paragraph A47 or A48, wherein the height of the thermal actuator decreases towards the minimum height in response to a decrease in a/the temperature of the thermal actuator.

A52. The thermal actuator of paragraph A47, wherein the maximum height of the thermal actuator is less than a distance associated with a critical Rayleigh number of a self-regulating thermal insulation in which the thermal actuator is configured for use.

A53. The thermal actuator of any of paragraphs A1-A52, wherein the first segment comprises a/the plurality of first segments, and wherein each respective first segment of the plurality of first segments has a respective segment length, each respective segment length being substantially equal to the first length.

A54. The thermal actuator of any of paragraphs A1-A53, wherein the first segment comprises a/the plurality of first segments, and wherein each respective first segment is coupled to a respective adjacent first segment by a respective weld, a respective solder joint, an adhesive, and/or a respective brazed joint.

A54.1. The thermal actuator of any of paragraphs A1-A54, wherein the second segment is plasma sprayed on the first segment, and/or electrochemically deposited on the first segment.

A54.2. The thermal actuator of any of paragraphs A1-A54.1, wherein the first segment is plasma sprayed on the second segment, and/or electrochemically deposited on the second segment.

A55. The thermal actuator of any of paragraphs A1-A54.2, wherein second segment is coupled to the first segment by a weld, a solder joint, a brazed joint, and/or a diffusion bond.

B1. A self-regulating thermal insulation, comprising:
a first plate having a first outer surface and a first inner surface;
a second plate having a second outer surface and a second inner surface, the second inner surface facing the first inner surface of the first plate;
a support structure coupling the first plate to the second plate, the support structure being configured to position the first plate with respect to the second plate such that the first plate is separated from the second plate by an insulation thickness; and
an internal partition positioned between the first plate and the second plate, wherein the self-regulating thermal insulation is configured such that a thermal resistance of the self-regulating thermal insulation automatically changes in response to a change in a temperature adjacent one or more of the first outer surface of the first plate and the second outer surface of the second plate.

B2. The self-regulating thermal insulation of paragraph B1, wherein the internal partition is configured to move with respect to the first plate in response to a/the change in a/the temperature adjacent one or more of the first outer surface of the first plate and the second outer surface of the second plate.

B2.1. The self-regulating thermal insulation of paragraph B2, wherein the self-regulating thermal insulation further comprises an actuator coupled to the second inner surface of the second plate, the actuator being configured to move the internal partition with respect to the first plate in response to a/the change in a/the temperature adjacent one or more of the first outer surface of the first plate and the second outer surface of the second plate.

B2.2. The self-regulating thermal insulation of paragraph B2.1, wherein the actuator is coupled to the internal partition.

B2.3. The self-regulating thermal insulation of paragraph B2.1 or B2.2, wherein the self-regulating thermal insulation is configured such that movement of the internal partition with respect to the first plate changes the thermal resistance of the self-regulating thermal insulation.

B3. The self-regulating thermal insulation of any of paragraphs B1-B2.3, wherein the internal partition is configured to move with respect to the second plate in response to a/the change in a/the temperature adjacent one or more of the first outer surface of the first plate and the second outer surface of the second plate.

B3.1. The self-regulating thermal insulation of paragraph B3, wherein the self-regulating thermal insulation further comprises an/the actuator coupled to the second inner surface of the second plate, the actuator being configured to move the internal partition with respect to the second plate in response to a/the change in a/the temperature adjacent one or more of the first outer surface of the first plate and the second outer surface of the second plate.

B3.2. The self-regulating thermal insulation of paragraph B3.1, wherein the actuator is coupled to the internal partition.

B3.3. The self-regulating thermal insulation of paragraph B3.1 or B3.2, wherein the self-regulating thermal insulation is configured such that movement of the internal partition with respect to the second plate changes the thermal resistance of the self-regulating thermal insulation.

B4. The self-regulating thermal insulation of any of paragraphs B1-B3.3, wherein the internal partition is substantially stationary with respect to the first plate and the second plate.

B5. The self-regulating thermal insulation of any of paragraphs B1-B4, wherein the internal partition comprises a plurality of internal partitions, each of the internal partitions of the plurality of internal partitions being spaced apart from one another and positioned between the first plate and the second plate.

B6. The self-regulating thermal insulation of any of paragraphs B1-B5, further comprising an/the actuator, wherein the actuator is the thermal actuator of any of paragraphs A1-A55.

B6.1. The self-regulating thermal insulation of paragraph B6, wherein the actuator is coupled to the second inner surface of the second plate or to the internal partition.

B6.2. The self-regulating thermal insulation of paragraph B6 or B6.1, wherein the actuator is coupled to the second inner surface of the second plate or to the internal partition, adjacent a/the second actuator end of the actuator.

B6.3. The self-regulating thermal insulation of any of paragraphs B6-B6.2, wherein the actuator is coupled to the second inner surface of the second plate or to the internal partition at a/the second contact surface of the actuator, adjacent a/the second actuator end of the actuator.

B6.4. The self-regulating thermal insulation of any of paragraphs B6-B6.3, wherein the actuator comprises a plurality of actuators.

B7. The self-regulating thermal insulation of paragraph B6.4, wherein the internal partition comprises a/the plurality of internal partitions, wherein at least a first actuator of the plurality of actuators is positioned between the second plate and a first internal partition of the plurality of internal partitions, and wherein at least a second actuator of the plurality of actuators is positioned between the first internal partition and a second internal partition of the plurality of internal partitions.

B8. The self-regulating thermal insulation of any of paragraphs B6.4-B7, wherein the internal partition comprises a/the plurality of internal partitions, wherein at least one actuator of the plurality of actuators is positioned between each respective adjacent pair of internal partitions of the plurality of internal partitions, and wherein at least one actuator of the plurality of actuators is positioned between the second plate and one of the plurality of internal partitions.

B8.1. The self-regulating thermal insulation of any of paragraphs B6-B8, wherein the thermal actuator is configured to automatically move with respect to the internal partition in response to a/the change in a/the temperature adjacent one or more of the first outer surface of the first plate and the second outer surface of the second plate, thereby changing the thermal resistance of the self-regulating thermal insulation.

B9. The self-regulating thermal insulation of any of paragraphs B1-B8.1, wherein the self-regulating thermal insulation automatically changes configuration in response to a/the change in a/the temperature adjacent one or more of the first outer surface of the first plate and the second outer surface of the second plate.

B9.1. The self-regulating thermal insulation of paragraph B9, wherein the self-regulating thermal insulation is configured to transition through a continuum of configurations between a first configuration and a second configuration in response to a/the change in a/the temperature adjacent one or more of the first outer surface of the first plate and the second outer surface of the second plate.

B9.2. The self-regulating thermal insulation of paragraph B9.1, wherein the self-regulating thermal insulation automatically transitions towards the second configuration in response to an increase in temperature adjacent the second outer surface of the second plate.

B9.3. The self-regulating thermal insulation of any of paragraphs B9.1-B9.2, wherein the self-regulating thermal insulation automatically transitions towards the first configuration in response to a decrease in temperature adjacent the first outer surface of the first plate.

B10. The self-regulating thermal insulation of any of paragraphs B9.1-B9.3, wherein, in the first configuration, the thermal resistance of the self-regulating thermal insulation is maximized.

B11. The self-regulating thermal insulation of any of paragraphs B9.1-B10, wherein, in the first configuration, each internal partition of a/the plurality of internal partitions is substantially equally spaced apart from a respective adjacent internal partition by a first distance.

B11.1. The self-regulating thermal insulation of paragraph B11, wherein, in the first configuration, a second distance between the first inner surface of the first plate and an adjacent internal partition of the plurality of internal partitions is less than or equal to the first distance.

B11.2. The self-regulating thermal insulation of paragraph B11 or B11.1, wherein, in the first configuration, a respective internal partition of the plurality of internal partitions adjacent the second inner surface of the second plate is substantially spaced apart from the second plate by the first distance.

B12. The self-regulating thermal insulation of any of paragraphs B9.1-B11.2, wherein, in the first configuration, the self-regulating thermal insulation is configured such that substantially no natural convection occurs between adjacent internal partitions of a/the plurality of internal partitions, between the first plate and a respective adjacent internal partition of the plurality of internal partitions, or between the second plate and a respective adjacent internal partition of the plurality of internal partitions.

B12.1. The self-regulating thermal insulation of paragraph B12, wherein the self-regulating thermal insulation is configured to form a stagnant air barrier between respective adjacent pairs of internal partitions of the plurality of internal partitions.

B13. The self-regulating thermal insulation of any of paragraphs B9.1-B12.1, wherein, in the first configuration, the self-regulating thermal insulation is configured such that substantially no thermal conduction occurs between adjacent internal partitions of a/the plurality of internal partitions, between the first plate and a respective adjacent internal partition of the plurality of internal partitions, or between the second plate and a respective adjacent internal partition of the plurality of internal partitions.

B14. The self-regulating thermal insulation of any of paragraphs B9.1-B13, wherein, in the first configuration, a/the first actuator end of an/the actuator is free from contact with the internal partition.

B15. The self-regulating thermal insulation of any of paragraphs B9.1-B14, wherein, in the second configuration, each internal partition of a/the plurality of internal partitions is substantially equally spaced apart from a respective adjacent internal partition by a third distance, wherein the third distance is less than a/the first distance between respective internal partitions in the first configuration.

B16. The self-regulating thermal insulation of any of paragraphs B9.1-B15, wherein, in the second configuration, the thermal resistance of the self-regulating thermal insulation is decreased as compared to the thermal resistance in the first configuration.

B17. The self-regulating thermal insulation of any of paragraphs B9.1-B16, wherein, in the second configuration, a fourth distance between the first inner surface of the first plate and an adjacent internal partition of the plurality of internal partitions is greater than a/the second distance between the first inner surface of the first plate and the adjacent internal partition of the plurality of internal partitions in the first configuration.

B18. The self-regulating thermal insulation of any of paragraphs B9.1-B17, wherein, in the second configuration, the self-regulating thermal insulation is configured such that natural convection occurs between the first plate and a respective adjacent internal partition of the plurality of internal partitions.

B19. The self-regulating thermal insulation of any of paragraphs B9.1-B18, wherein, in the second configuration, an/the actuator contacts the internal partition adjacent a/the first actuator end of the actuator.

B20. The self-regulating thermal insulation of any of paragraphs B9.1-B19, wherein, in the second configuration, one or more respective actuators of a/the plurality of actuators contacts a respective internal partition of a/the plurality of internal partitions, adjacent a/the respective first actuator end of the one or more respective actuators.

B20.1. The self-regulating thermal insulation of paragraph B20, wherein the plurality of actuators are configured such that an increase in an external temperature adjacent the second outer surface of the second plate causes the plurality of actuators to contact the respective internal partition with an increased pressure, thereby decreasing the thermal resistance of the self-regulating thermal insulation.

B21. The self-regulating thermal insulation of any of paragraphs B9.1-B20.1, wherein, in the second configuration, the self-regulating thermal insulation is configured such that thermal conduction occurs between adjacent internal partitions of a/the plurality of internal partitions, or between the second plate and a respective adjacent internal partition of the plurality of internal partitions.

B22. The self-regulating thermal insulation of any of paragraphs B1-B21, wherein the insulation thickness is substantially constant.

B23. The self-regulating thermal insulation of any of paragraphs B1-B22, wherein the internal partition is coupled to the support structure.

B24. The self-regulating thermal insulation of any of paragraphs B1-B23, wherein the self-regulating thermal insulation comprises a/the plurality of actuators, the plurality of actuators having a range of temperatures over which they respectively actuate.

B25. The self-regulating thermal insulation of any of paragraphs B1-B24, wherein the self-regulating thermal insulation comprises a/the plurality of actuators, the plurality of actuators having a range of temperatures over which they respectively contact a respective internal partition of a/the plurality of internal partitions.

B26. The self-regulating thermal insulation of any of paragraphs B1-B25, wherein a decrease in an/the external temperature adjacent the second outer surface of the second plate causes actuation of a/the actuator, thereby increasing the thermal resistance of the self-regulating thermal insulation.

B27. The self-regulating thermal insulation of any of paragraphs B1-B26, wherein an increase in an/the external temperature adjacent the second outer surface of the second plate causes actuation of a/the actuator, thereby decreasing the thermal resistance of the self-regulating thermal insulation.

B28. The self-regulating thermal insulation of any of paragraphs B1-B27, wherein the second outer surface of the second plate is configured to be positioned adjacent a part, or a portion thereof, that is curing at an elevated temperature.

B29. The self-regulating thermal insulation of any of paragraphs B1-B28, wherein the self-regulating thermal insulation comprises a/the plurality of actuators, the plurality of actuators each having a/the respective second contact surface adjacent a/the respective second actuator end, wherein at least some of the second contact surfaces adjacent the second actuator ends of the plurality of actuators are coupled to the second inner surface of the second plate.

B30. The self-regulating thermal insulation of any of paragraphs B1-B29, wherein the self-regulating thermal insulation comprises a/the plurality of actuators, the plurality of actuators each having a/the respective second contact surface adjacent a/the respective second actuator end, wherein at least some of the second contact surfaces adjacent the second actuator ends of the plurality of actuators are coupled to a respective internal partition of a/the plurality of internal partitions.

B31. The self-regulating thermal insulation of any of paragraphs B1-B30, wherein the self-regulating thermal insulation comprises a/the plurality of actuators, the plurality of actuators each having a/the respective first contact surface adjacent a/the respective first actuator end, wherein at least some of the first contact surfaces of the plurality of actuators are coupled to a respective internal partition of a/the plurality of internal partitions.

B32. The self-regulating thermal insulation of any of paragraphs B1-B31, wherein the support structure is a rigid support structure.

B33. The self-regulating thermal insulation of any of paragraphs B1-B32, wherein the internal partition is separated from the support structure by a gap.

B33.1. The self-regulating thermal insulation of paragraph B33, wherein the gap is smaller than a/the first distance between the internal partition and the second inner surface of the second plate.

B34. The self-regulating thermal insulation of paragraph B33 or B33.1, wherein the internal partition comprises a/the plurality of internal partitions, and wherein the gap is smaller than a/the first distance between respective internal partitions of the plurality of internal partitions.

B35. The self-regulating thermal insulation of any of paragraphs B33-B34, wherein the gap is small enough to substantially prevent natural convection between the internal partition and the support structure.

B36. The self-regulating thermal insulation of any of paragraphs B1-B35, wherein the second plate is stiff.

B37. The self-regulating thermal insulation of any of paragraphs B1-B36, wherein the second plate comprises one or more of aluminum, a polymer, and a composite material.

B38. The self-regulating thermal insulation of any of paragraphs B1-B37, wherein the second plate is configured to provide a second barrier to heat and air.

B39. The self-regulating thermal insulation of any of paragraphs B1-B38, wherein the first plate is stiff.

B40. The self-regulating thermal insulation of any of paragraphs B1-B39, wherein the first plate comprises one or more of aluminum, a/the polymer, and a/the composite material.

B41. The self-regulating thermal insulation of any of paragraphs B1-B40, wherein the first plate is configured to provide a first barrier to heat and air.

B42. The self-regulating thermal insulation of any of paragraphs B1-B41, wherein the internal partition is stiff.

B43. The self-regulating thermal insulation of any of paragraphs B1-B42, wherein the internal partition comprises one or more of aluminum, a/the polymer, and a/the composite material.

B44. The self-regulating thermal insulation of any of paragraphs B1-B43, wherein the internal partition is configured to provide a third barrier to heat and air.

B45. The self-regulating thermal insulation of any of paragraphs B1-B44, wherein the self-regulating thermal insulation is configured such that the thermal resistance of the self-regulating thermal insulation automatically decreases in response to an/the increase in a/the temperature adjacent the second outer surface of the second plate.

B46. The self-regulating thermal insulation of any of paragraphs B1-B45, wherein the self-regulating thermal insulation is configured such that a thermal conductance of the self-regulating thermal insulation automatically changes in response to a/the change in a/the temperature adjacent one or more of the first outer surface of the first plate and the second outer surface of the second plate.

B47. The self-regulating thermal insulation of any of paragraphs B1-B46, wherein the first plate is not coupled to the internal partition.

B48. The self-regulating thermal insulation of any of paragraphs B1-B47, wherein an/the actuator is configured to automatically move the internal partition in response to a/the change in a/the temperature adjacent one or more of the first outer surface of the first plate and the second outer surface of the second plate.

B49. The self-regulating thermal insulation of any of paragraphs B1-B48, wherein the self-regulating thermal insulation is configured such that movement of the internal partition with respect to the first plate and the second plate changes the natural convection conditions of the self-regulating thermal insulation.

B50. The self-regulating thermal insulation of any of paragraphs B1-B49, wherein an/the actuator is configured to conduct heat through a portion of the self-regulating thermal insulation when the actuator contacts the internal partition adjacent a/the first actuator end.

B51. The self-regulating thermal insulation of any of paragraphs B1-B50, wherein the self-regulating thermal insulation is configured to keep a process temperature of an object being insulated by the self-regulating thermal insulation substantially constant over a period of time.

B52. The self-regulating thermal insulation of any of paragraphs B1-B51, wherein the self-regulating thermal insulation is configured to self-regulate in response to changes in an ambient temperature adjacent the first outer surface of the first plate and in response to changes in a process temperature adjacent the second outer surface of the second plate.

B53. The self-regulating thermal insulation of any of paragraphs B1-B52, wherein the self-regulating thermal insulation is configured such that its thermal resistance is automatically changed without the use of a feedback control system.

B54. The self-regulating thermal insulation of any of paragraphs B1-B53, wherein the self-regulating thermal insulation is configured such that its thermal resistance is automatically changed without the use of a power source.

B55. The self-regulating thermal insulation of any of paragraphs B1-B54, wherein the self-regulating thermal insulation is configured such that its thermal resistance is automatically changed without the use of monitoring.

B56. The self-regulating thermal insulation of any of paragraphs B1-B55, wherein the self-regulating thermal insulation is configured such that its thermal resistance is automatically changed without human intervention.

B57. The self-regulating thermal insulation of any of paragraphs B1-B56, wherein the self-regulating thermal insulation comprises a/the plurality of actuators, the internal partition comprises a/the plurality of internal partitions, and wherein the plurality of actuators are distributed throughout the self-regulating thermal insulation and between each respective adjacent pair of internal partitions of the plurality of internal partitions.

B58. The self-regulating thermal insulation of any of paragraphs B1-B57, wherein the internal partition comprises a/the plurality of internal partitions, wherein each respective pair of adjacent internal partitions of the plurality of internal partitions is spaced apart by a partition space, and wherein the partition space contains a gas.

B59. The self-regulating thermal insulation of any of paragraphs B1-B58, wherein the internal partition comprises a/the plurality of internal partitions spaced apart between the first plate and the second plate such that substantially no natural convection occurs between respective adjacent internal partitions of the plurality of internal partitions.

B60. The self-regulating thermal insulation of any of paragraphs B1-B59, wherein the internal partition comprises a/the plurality of internal partitions spaced apart between the first plate and the second plate, wherein respective adjacent internal partitions of the plurality of internal partitions are substantially fixed with respect to one another and with respect to the first plate and the second plate.

B61. The self-regulating thermal insulation of any of paragraphs B1-B59, wherein the internal partition comprises a/the plurality of internal partitions spaced apart between the first plate and the second plate, wherein respective adjacent internal partitions of the plurality of internal partitions are moveable with respect to one another and with respect to the first plate and the second plate.

B62. The self-regulating thermal insulation of any of paragraphs B1-B61, wherein the support structure comprises a thermal insulator.

B63. The self-regulating thermal insulation of any of paragraphs B1-B62, wherein a/the first contact surface of an/the actuator is coupled to the internal partition.

B64. The self-regulating thermal insulation of any of paragraphs B1-B63, wherein the internal partition comprises a/the plurality of internal partitions spaced apart between the first plate and the second plate, wherein the self-regulating thermal insulation comprises a/the plurality of actuators, the plurality of actuators each having a/the respective first contact surface adjacent a/the respective first actuator end and a/the respective second contact surface adjacent a/the respective second actuator end, wherein the plurality of actuators comprises a plurality of internal actuators and a plurality of base actuators, wherein the respective second contact surfaces of the plurality of base actuators are each coupled to the second inner surface of the second plate, wherein the respective first contact surfaces of the plurality of base actuators are each coupled to a first internal partition of the plurality of internal partitions, wherein the respective first actuator ends of the plurality of internal actuators are each coupled to a second internal partition of the plurality of internal partitions, and wherein the respective second actuator ends of the plurality of internal actuators are each coupled to the first internal partition of the plurality of internal partitions.

B65. The self-regulating thermal insulation of any of paragraphs B1-B64, wherein the internal partition comprises a/the first internal partition and a/the second internal partition, the first internal partition being positioned adjacent the second plate and the second internal partition being positioned adjacent the first plate, wherein the self-regulating thermal insulation comprises an/the actuator, wherein the actuator comprises a first actuator positioned between the second plate and the first internal partition and a second actuator positioned between the first internal partition and the second internal partition, the first actuator and the second actuator being staggered with respect to one another.

B66. The self-regulating thermal insulation of any of paragraphs B1-B65, wherein an end of the self-regulating thermal insulation is open, thereby venting an interior portion of the self-regulating thermal insulation to an ambient environment, the interior portion being defined by the first plate, the second plate, and the support structure, the end being positioned opposite the support structure.

B67. The self-regulating thermal insulation of any of paragraphs B1-B65, wherein the support structure is configured to substantially seal an interior portion of the self-regulating thermal insulation from an ambient environment, the interior portion being defined by the first plate, the second plate, and the support structure.

B68. The self-regulating thermal insulation of any of paragraphs B1-B67, wherein an/the actuator is coupled to the second inner surface of the second plate or to the internal partition by a fastener, a rivet, a nut, a bolt, an adhesive, a weld, a solder joint, a diffusion bond, and/or a brazed joint adjacent a/the second actuator end of the actuator.

B68.1. The self-regulating thermal insulation of any of paragraphs B1-B68, wherein an/the actuator is plasma sprayed and/or electrochemically deposited on the second inner surface of the second plate or on the internal partition, adjacent a/the second actuator end of the actuator.

B69. The self-regulating thermal insulation of any of paragraphs B1-B68.1, wherein an/the actuator is coupled to the second inner surface of the second plate or to the internal partition by a fastener, a rivet, a nut, a bolt, an adhesive, a weld, a solder joint, a diffusion bond, and/or a brazed joint adjacent a/the first actuator end of the actuator.

B69.1. The self-regulating thermal insulation of any of paragraphs B1-B69, wherein an/the actuator is plasma sprayed and/or electrochemically deposited on the second inner surface of the second plate or on the internal partition, adjacent a/the first actuator end of the actuator.

B70. The self-regulating thermal insulation of any of paragraphs B1-B69.1, wherein the partition is coupled to the support structure by a fastener, a rivet, a nut, a bolt, an adhesive, a weld, a solder joint, a diffusion bond, and/or a brazed joint.

B71. The self-regulating thermal insulation of any of paragraphs B1-B70, wherein the first plate is coupled to the support structure by a fastener, a rivet, a nut, a bolt, an adhesive, a weld, a solder joint, a diffusion bond, and/or a brazed joint.

B72. The self-regulating thermal insulation of any of paragraphs B1-B71, wherein the second plate is coupled to the support structure by a fastener, a rivet, a nut, a bolt, an adhesive, a weld, a solder joint, a diffusion bond, and/or a brazed joint.

B73. The self-regulating thermal insulation of any of paragraphs B1-B72, wherein the internal partition comprises a thermal insulator.

B74. The self-regulating thermal insulation of any of paragraphs B1-B73, wherein the internal partition is moveable with respect to the support structure.

C1. A self-regulating thermal insulation system for insulating an object, the self-regulating thermal insulation system comprising:
the self-regulating thermal insulation of any of paragraphs B1-B74; and
the object.

C2. The self-regulating thermal insulation system of paragraph C1, wherein the object comprises one or more of a part, a component, an apparatus, a structure, a vehicle, a dwelling, and a building.

C3. The self-regulating thermal insulation system of any of paragraphs C1-C2, wherein the object comprises a composite part.

C4. The self-regulating thermal insulation system of any of paragraphs C1-C3, wherein the object comprises a part being cured.

C5. The self-regulating thermal insulation system of any of paragraphs C1-C4, wherein the self-regulating thermal insulation is coupled to the object.

C6. The self-regulating thermal insulation system of any of paragraphs C1-C5, wherein the self-regulating thermal insulation contacts the object.

C7. The self-regulating thermal insulation system of any of paragraphs C1-C6, wherein the self-regulating thermal insulation is positioned with respect to the object such that the second outer surface of the second plate faces the object.

C8. The self-regulating thermal insulation system of any of paragraphs C1-C7, wherein the self-regulating thermal insulation is positioned with respect to the object such that the second outer surface of the second plate contacts the object.

C9. The self-regulating thermal insulation system of any of paragraphs C1-C8, wherein a local object temperature of a location on or in the object determines the temperature adjacent the second outer surface of the second plate.

C10. The self-regulating thermal insulation system of any of paragraphs C1-C9, wherein the self-regulating thermal insulation comprises a plurality of pieces of self-regulating thermal insulation, the plurality of pieces being coupled with respect to each other.

C10.1. The self-regulating thermal insulation system of paragraph C10, wherein each respective piece of the plurality of pieces of self-regulating thermal insulation is coupled to at least one other respective piece of the plurality of pieces of self-regulating thermal insulation.

C10.2. The self-regulating thermal insulation system of paragraph C10 or C10.1, wherein each respective piece of the plurality of pieces of self-regulating thermal insulation is coupled to a substrate.

C10.3. The self-regulating thermal insulation system of any of paragraphs C1-C10.2, wherein the self-regulating thermal insulation comprises a/the plurality of pieces of self-regulating thermal insulation, the plurality of pieces being contained in and/or coupled to a blanket, encased in silicone, and/or positioned within a fabric cover.

C10.4. The self-regulating thermal insulation system of any of paragraphs C1-C10.3, wherein a/the plurality of pieces of self-regulating thermal insulation are contained within and/or coupled to a flexible material.

C10.5. The self-regulating thermal insulation system of any of paragraphs C10-C10.4, wherein the plurality of pieces of self-regulating thermal insulation are coupled together by a connector, a weld, a brazed joint, a solder joint, a hinged joint, a flexible joint, and/or an adhesive.

C10.6. The self-regulating thermal insulation system of any of paragraphs C10-C10.5, wherein the plurality of pieces of self-regulating thermal insulation are thermally isolated from one another.

C11. The self-regulating thermal insulation system of any of paragraphs C10-C10.6, wherein each respective piece of the plurality of pieces of self-regulating thermal insulation is configured such that the respective thermal resistance of the respective piece of self-regulating thermal insulation automatically changes, independently of the respective thermal resistances of the other respective pieces of self-regulating thermal insulation, in response to a/the local object temperature of the object at a location adjacent the respective piece of self-regulating thermal insulation.

C12. The self-regulating thermal insulation system of any of paragraphs C10-C11, wherein a respective piece of the plurality of pieces of self-regulating thermal insulation has a different thermal resistance at a given time than a different respective piece of the plurality of pieces of self-regulating thermal insulation at the given time.

C12.1. The self-regulating thermal insulation system of any of paragraphs C10-C12, wherein each respective piece of the plurality of pieces of self-regulating thermal insulation is configured such that a respective thermal resistance of the respective piece automatically changes, independently of the respective thermal resistance of different respective pieces of the plurality of pieces of self-regulating thermal insulation, in response to a local temperature variation adjacent the respective piece of self-regulating thermal insulation.

C13. The self-regulating thermal insulation system of any of paragraphs C1-C12.1, wherein the self-regulating thermal insulation comprises a continuous sheet of insulation material that is sized and shaped to cover at least a portion of the object.

C14. The self-regulating thermal insulation system of any of paragraphs C1-C13, wherein the self-regulating thermal insulation comprises a rigid structure.

C15. The self-regulating thermal insulation system of any of paragraphs C1-C14, wherein the self-regulating thermal insulation comprises a blanket.

C16. The self-regulating thermal insulation system of any of paragraphs C1-C15, wherein the self-regulating thermal insulation comprises a flexible sheet.

D1. A method, comprising:
making the self-regulating thermal insulation of any of paragraphs B1-B74.

D1.1. The method of paragraph D1, further comprising insulating a body using the self-regulating thermal insulation.

D2. The method of paragraph D1.1, wherein the insulating the body comprises insulating an object or a portion thereof during a manufacturing process.

D3. The method of any of paragraphs D1.1-D2, wherein the insulating the body comprises insulating at least a portion of a composite part during curing.

D4. The method of any of paragraphs D1.1-D3, wherein the insulating the body comprises insulating an/the object or a/the portion thereof during a thermal process.

D5. The method of any of paragraphs D1-D4, further comprising positioning the self-regulating thermal insulation on a/the body.

D6. The method of any of paragraphs D1-D5, further comprising coupling the self-regulating thermal insulation to a/the body.

D7. The method of any of paragraphs D1-D6, further comprising positioning the self-regulating thermal insulation with respect to a/the body such that the second outer surface of the second plate of the self-regulating thermal insulation faces the body.

D8. The method of any of paragraphs D1.1-D7, wherein the insulating the body comprises using the self-regulating thermal insulation in an enclosure.

D9. The method of paragraph D8, wherein the enclosure comprises a vehicle or a building.

D10. The method of any of paragraphs D1.1-D9, wherein the insulating the body comprises maintaining a temperature of at least a portion of the body within a predetermined range for a predetermined period of time.

D10.1. The method of paragraph D10, wherein the body comprises at least a portion of a/the composite part.

D11. The method of any of paragraphs D1.1-D10.1, wherein the insulating the body comprises insulating a living being.

D12. The method of any of paragraphs D1.1-D11, wherein the insulating the body comprises automatically changing a thermal resistance of the self-regulating thermal insulation without human intervention, a power source, or a feedback control system.

D13. The method of any of paragraphs D1-D12, wherein the making the self-regulating thermal insulation comprises coupling the first plate with respect to the second plate using the support structure, wherein the support structure is configured to position the first plate with respect to the second plate such that the first plate is separated from the second plate by the insulation thickness.

D14. The method of any of paragraphs D1-D13, wherein the making the self-regulating thermal insulation comprises positioning the internal partition between the first plate and the second plate.

D15. The method of any of paragraphs D1-D14, wherein the making the self-regulating thermal insulation comprises coupling the internal partition to the support structure.

D16. The method of any of paragraphs D1-D15, wherein the making the self-regulating thermal insulation comprises positioning a plurality of internal partitions between the first plate and the second plate.

D17. The method of any of paragraphs D1-D16, wherein the making the self-regulating thermal insulation comprises positioning a/the thermal actuator between the second plate and the internal partition.

D18. The method of any of paragraphs D1-D17, wherein the making the self-regulating thermal insulation comprises coupling a/the thermal actuator to the second plate.

D19. The method of any of paragraphs D1-D12, wherein the making the self-regulating thermal insulation comprises coupling a/the thermal actuator to the internal partition.

E1. A method, comprising:
providing the self-regulating thermal insulation system of any of paragraphs C1-C16.

E1.1. The method of paragraph E1, further comprising using the self-regulating thermal insulation system to insulate a body.

E2. The method of paragraph E1.1, wherein the using the self-regulating thermal insulation system to insulate the body comprises insulating an object or a portion thereof during a manufacturing process.

E3. The method of any of paragraphs E1.1-E2, wherein the using the self-regulating thermal insulation system to insulate the body comprises insulating at least a portion of a composite part during curing.

E4. The method of any of paragraphs E1.1-E3, wherein the using the self-regulating thermal insulation system to insulate the body comprises insulating an/the object or a/the portion thereof during a thermal process.

E5. The method of any of paragraphs E1-E4, further comprising positioning the self-regulating thermal insulation system on a/the body.

E6. The method of any of paragraphs E1-E5, further comprising coupling the self-regulating thermal insulation system to a/the body.

E7. The method of any of paragraphs E1-E6, further comprising positioning the self-regulating thermal insulation system with respect to a/the body such that the second outer surface of the second plate of the self-regulating thermal insulation system faces the body.

E8. The method of any of paragraphs E1.1-E7, wherein the using the self-regulating thermal insulation system to insulate the body comprises using the self-regulating thermal insulation system in an enclosure.

E9. The method of paragraph E8, wherein the enclosure comprises a vehicle or a building.

E10. The method of any of paragraphs E1.1-E9, wherein the using the self-regulating thermal insulation system to insulate the body comprises maintaining a temperature of at least a portion of the body within a predetermined range for a predetermined period of time.

E11. The method of any of paragraphs E1.1-E10, wherein the using the self-regulating thermal insulation system to insulate the body comprises insulating a living being.

E12. The method of any of paragraphs E1.1-E11, wherein the using the self-regulating thermal insulation system to insulate the body comprises automatically increasing a thermal resistance of the self-regulating thermal insulation system without human intervention, a power source, or a feedback control system.

F1. A method, comprising: using the actuator of any of paragraphs A1-A55 to form a self-regulating thermal insulation.

F2. The method of paragraph F1, further comprising insulating an object using the self-regulating thermal insulation.

F3. The method of paragraph F2, wherein the insulating the object comprises insulating the object such that the object remains within a predetermined temperature range for a predetermined amount of time.

G1. A method, comprising:
making the actuator of any of paragraphs A1-A55.

G1.1. The method of paragraph G1, wherein the making the actuator comprises making a plurality of actuators of any of paragraphs A1-A55.

G2. The method of paragraph G1 or G1.1, further comprising incorporating the actuator in a self-regulating thermal insulation such that the actuator is configured to automatically effectuate a change in the thermal resistance of the self-regulating thermal insulation in response to a change in a temperature adjacent the self-regulating thermal insulation.

G2.1. The method of paragraph G2, wherein the incorporating the actuator in the self-regulating thermal insulation comprises incorporating the actuator into the self-regulating thermal insulation of any of paragraphs B1-B74.

G2.2. The method of any of paragraphs G2-G2.1, wherein the incorporating the actuator in the self-regulating thermal insulation comprises coupling a/the respective second end of at least one respective actuator to a/the second plate of the self-regulating thermal insulation.

G2.3. The method of paragraph G2.2, wherein the coupling the respective second end of at least one respective actuator to the second plate comprises coupling the second end via a rivet, an adhesive, a fastener, a weld, a solder joint, a braze joint, plasma spraying, electrochemical depositing, and/or diffusion bonding.

G2.4. The method of any of paragraphs G2-G2.3, wherein the incorporating the actuator in the self-regulating thermal insulation comprises coupling a/the respective first end of at least one respective actuator to a/the internal partition of the self-regulating thermal insulation, the internal partition being positioned between a/the first plate and a/the second plate of the self-regulating thermal insulation.

G2.5. The method of paragraph G2.4, wherein the coupling the respective first end of at least one respective actuator to the internal partition comprises coupling the first end via a rivet, an adhesive, a fastener, a weld, a solder joint, a braze joint, plasma spraying, electrochemical depositing, and/or diffusion bonding.

G2.6. The method of any of paragraphs G2-G2.5, wherein the incorporating the actuator in the self-regulating thermal insulation comprises coupling a/the first plate of the self-regulating thermal insulation to a/the support structure.

G2.7. The method of paragraph G2.6, wherein the coupling the first plate to the support structure comprises coupling via a rivet, an adhesive, a fastener, a weld, a solder joint, a braze joint, plasma spraying, electrochemical depositing, and/or diffusion bonding.

G2.8. The method of any of paragraphs G2-G2.7, wherein the incorporating the actuator in the self-regulating thermal insulation comprises coupling a/the second plate of the self-regulating thermal insulation to a/the support structure.

G2.9. The method of paragraph G2.8, wherein the coupling the second plate to the support structure comprises coupling via a rivet, an adhesive, a fastener, a weld, a solder joint, a braze joint, plasma spraying, electrochemical depositing, and/or diffusion bonding.

G2.10. The method of any of paragraphs G2-G2.9, wherein the incorporating the actuator in the self-regulating thermal insulation comprises coupling an/the internal partition to a/the support structure.

G3. The method of any of paragraphs G1-G2.10, wherein the actuator is configured to one or more of move an/the internal partition of the self-regulating thermal insulation with respect to a/the first plate and a/the second plate of the self-regulating insulation and intermittently contact the internal partition of the self-regulating thermal insulation in response to a/the change in a/the temperature adjacent the self-regulating thermal insulation, thereby effectuating a/the change in the thermal resistance of the self-regulating insulation.

G4. The method of any of paragraphs G2-G3, further comprising insulating an object using the self-regulating thermal insulation such that the object remains within a predetermined temperature range for a predetermined amount of time.

G5. The method of any of paragraphs G1-G4, wherein the making the actuator comprises:
providing a sheet of the first material; and
cutting a linear spiral in the sheet of the first material.

G6. The method of paragraph G5, further comprising forming a plurality of bends in the linear spiral to form the first segment of the actuator.

G7. The method of any of paragraphs G1-G6, wherein the making the actuator comprises coupling at least one second segment to the first lower surface of the first segment of the actuator.

G7.1. The method of paragraph G7, wherein the coupling at least one second segment to the first lower surface of the first segment comprises welding, soldering, brazing, plasma spraying, electrochemical depositing, and/or diffusion bonding the second segment with respect to the first lower surface of the first segment.

G8. The method of any of paragraphs G1-G7.1, wherein the making the actuator comprises coupling a/the plurality of second segments to the first lower surface of the first segment of the actuator, wherein each respective second segment is spaced apart from the other respective second segments.

G8.1. The method of paragraph G8, wherein the coupling the plurality of second segments to the first lower surface of the first segment of the actuator comprises welding, soldering, brazing, plasma spraying, electrochemical depositing, and/or diffusion bonding each respective second segment with respect to the first lower surface of the first segment.

G9. The method of any of paragraphs G1-G8.1, wherein the making the actuator comprises forming at least one bend in the second segment.

G10. The method of any of paragraphs G1-G9, wherein the making the actuator comprises forming one bend in each of the second segments of a/the plurality of second segments.

G11. The method of any of paragraphs G1-G10, wherein the making the actuator comprises coupling a plurality of respective first segments together to form the contiguous layer.

G12. The method of paragraph G11, wherein the coupling the plurality of first segments together comprises welding, soldering, and/or brazing respective first segments together.

G13. The method of any of paragraphs G1-G12, wherein the making the actuator comprises forming the first segment comprising the first material having the first thermal expansion coefficient, the first segment having the first upper surface and the first lower surface opposite the first upper surface, the first segment being the contiguous layer and having the first length.

G14. The method of any of paragraphs G1-G13, wherein the making the actuator comprises coupling a/the plurality of second segments to the first segment, each second segment of the plurality of second segments comprising the second material having the second thermal expansion coefficient, the second thermal expansion coefficient being different from the first thermal expansion coefficient, each second segment having the second upper surface and the second lower surface opposite the second upper surface, wherein each second segment is coupled to the first segment such that the second upper surface of the second segment is coupled to the first lower surface of the first segment, wherein each second segment has a respective second length, each of the second lengths being less than the first length of the first segment, and wherein the coupling the plurality of second segments comprises coupling the second segments such that respective adjacent second segments are spaced apart from one another.

G15. The method of any of paragraphs G1-G14, wherein the making the actuator comprises arranging the first segment into a three-dimensional shape.

H1. An object including the self-regulating thermal insulation of any of paragraphs B1-B74.

H2. The object of paragraph H1, wherein the object comprises one or more of a vehicle, a part, a composite part, an aircraft, an aircraft component, a building, and a structure.

I1. An object including the self-regulating thermal insulation system of any of paragraphs C1-C16.

I2. The object of paragraph I1, wherein the object comprises one or more of a vehicle, a part, a composite part, an aircraft, an aircraft component, a building, and a structure.

J1. Use of the actuator of any of paragraphs A1-A55 to form a self-regulating thermal insulation system or a self-regulating thermal insulation.

K1. Use of the self-regulating thermal insulation of any of paragraphs B1-B74 to provide insulation.

L1. Use of the self-regulating thermal insulation system of any of paragraphs C1-C16 to provide insulation.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein, the phrase, "for example," the term "e.g.," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A self-regulating thermal insulation, comprising:
   a first plate having a first outer surface and a first inner surface;
   a second plate having a second outer surface and a second inner surface, the second inner surface facing the first inner surface of the first plate;
   a support structure coupling the first plate to the second plate, the support structure being configured to position the first plate with respect to the second plate such that the first plate is separated from the second plate by an insulation thickness;
   an internal partition positioned between the first plate and the second plate; and
   a thermal actuator coupled to the second inner surface of the second plate adjacent a second actuator end, wherein the thermal actuator is coupled to the internal partition at a first actuator end, wherein the thermal actuator is configured to automatically move the internal partition with respect to the first plate and the second plate in response to a change in a temperature adjacent one or more of the first outer surface of the first plate and the second outer surface of the second plate, thereby changing a thermal resistance of the self-regulating thermal insulation.

2. The self-regulating thermal insulation according to claim 1, wherein the internal partition comprises a plurality of internal partitions, each of the internal partitions of the plurality of internal partitions being spaced apart from one another and positioned between the first plate and the second plate.

3. The self-regulating thermal insulation according to claim 2, wherein the thermal actuator comprises a plurality of thermal actuators, wherein at least a first thermal actuator of the plurality of thermal actuators is positioned between the second plate and a first internal partition of the plurality of internal partitions, and wherein at least a second actuator of the plurality of thermal actuators is positioned between the first internal partition and a second internal partition of the plurality of internal partitions.

4. The self-regulating thermal insulation according to claim 2, wherein the self-regulating thermal insulation is configured to transition through a continuum of configurations between a first configuration and a second configuration in response to the change in the temperature adjacent one or more of the first outer surface of the first plate and the second outer surface of the second plate, wherein the self-regulating thermal insulation automatically transitions towards the second configuration in response to an increase in temperature adjacent the second outer surface of the second plate, wherein, in the first configuration, each internal partition of the plurality of internal partitions is substantially equally spaced apart from a respective adjacent internal partition by a first distance, wherein, in the second configuration, each internal partition of the plurality of internal partitions is substantially equally spaced apart from a respective adjacent internal partition by a second distance, wherein the second distance is less than the first distance between respective internal partitions in the first configuration, and wherein, in the second configuration, the thermal resistance of the self-regulating thermal insulation is decreased as compared to the thermal resistance in the first configuration.

5. The self-regulating thermal insulation according to claim 1, wherein the thermal actuator is configured to automatically contract in response to an increase in temperature adjacent the second outer surface of the second plate, and automatically expand in response to a decrease in temperature adjacent the second outer surface of the second plate.

6. The self-regulating thermal insulation according to claim 1, wherein the thermal actuator comprises a bi-metallic actuator comprising a plurality of contiguous first segments comprising a first metal and a plurality of second segments comprising a second metal, the plurality of second segments being spaced apart and coupled to the plurality of contiguous first segments.

7. The self-regulating thermal insulation according to claim 1, wherein the self-regulating thermal insulation is configured such that the thermal resistance of the self-regulating thermal insulation automatically decreases in response to an increase in a temperature adjacent the second outer surface of the second plate.

8. The self-regulating thermal insulation according to claim 1, wherein the self-regulating thermal insulation is configured such that movement of the internal partition with respect to the first plate and the second plate changes natural convection conditions of the self-regulating thermal insulation.

9. A self-regulating thermal insulation, comprising:
a first plate having a first outer surface and a first inner surface;
a second plate having a second outer surface and a second inner surface, the second inner surface facing the first inner surface of the first plate;
a support structure coupling the first plate to the second plate, the support structure being configured to position the first plate with respect to the second plate such that the first plate is separated from the second plate by an insulation thickness;
an internal partition positioned between the first plate and the second plate, wherein the internal partition is coupled to the support structure such that it is substantially stationary with respect to the first plate and the second plate; and
a thermal actuator coupled to the second inner surface of the second plate adjacent a second actuator end of the thermal actuator, wherein the thermal actuator is configured to automatically move with respect to the internal partition in response to a change in a temperature adjacent one or more of the first outer surface of the first plate and the second outer surface of the second plate, thereby changing a thermal resistance of the self-regulating thermal insulation.

10. The self-regulating thermal insulation according to claim 9, wherein the self-regulating thermal insulation is configured to transition through a continuum of configurations between a first configuration and a second configuration in response to the change in the temperature adjacent one or more of the first outer surface of the first plate and the second outer surface of the second plate, wherein the self-regulating thermal insulation automatically transitions towards the second configuration in response to an increase in temperature adjacent the second outer surface of the second plate, and wherein, in the second configuration, the thermal resistance of the self-regulating thermal insulation is decreased as compared to the thermal resistance in the first configuration.

11. The self-regulating thermal insulation according to claim 10, wherein, in the first configuration, the self-regulating thermal insulation is configured such that substantially no thermal conduction occurs between the second plate and the internal partition, wherein, in the first configuration, a first actuator end of the thermal actuator is free from contact with the internal partition, and wherein, in the second configuration, the first actuator end of the thermal actuator contacts the internal partition, thereby permitting thermal conduction between the second plate and the internal partition.

12. The self-regulating thermal insulation according to claim 9, wherein the thermal actuator is configured to automatically expand in response to an increase in temperature adjacent the second outer surface of the second plate, and automatically contract in response to a decrease in temperature adjacent the second outer surface of the second plate.

13. The self-regulating thermal insulation according to claim 9, wherein the self-regulating thermal insulation is configured such that a thermal conductance of the self-regulating thermal insulation automatically changes in response to the change in the temperature adjacent one or more of the first outer surface of the first plate and the second outer surface of the second plate, and wherein the thermal actuator is configured to conduct heat through a portion of the self-regulating thermal insulation when a first actuator end opposite the second actuator end contacts the internal partition.

14. A self-regulating thermal insulation system for insulating an object, the self-regulating thermal insulation system comprising:
a plurality of pieces of self-regulating thermal insulation coupled with respect to each other, wherein each respective piece of the plurality of pieces of self-regulating thermal insulation is configured such that a respective thermal resistance of the respective piece of self-regulating thermal insulation automatically changes, independently of the respective thermal resistances of the other respective pieces of self-regulating thermal insulation, in response to a local object temperature of the object adjacent the respective piece, wherein each piece of the plurality of pieces of self-regulating thermal insulation comprises:
a first plate having a first outer surface and a first inner surface;
a second plate having a second outer surface and a second inner surface, the second inner surface facing the first inner surface of the first plate;
a support structure coupling the first plate to the second plate, the support structure being configured to position the first plate with respect to the second plate such that the first plate is separated from the second plate by an insulation thickness;
an internal partition positioned between the first plate and the second plate; and
a thermal actuator positioned between the second plate and the internal partition, the thermal actuator being coupled to the second inner surface of the second plate, wherein the thermal actuator is configured to automatically expand and contract in response to respective changes in a temperature adjacent one or more of the first outer surface of the first plate and the second outer surface of the second plate, thereby changing a thermal resistance of the self-regulating thermal insulation.

15. The self-regulating thermal insulation system according to claim 14, further comprising the object, wherein the object comprises a composite part being cured, and wherein the self-regulating thermal insulation is positioned with respect to the object such that the second outer surface of the second plate faces the object.

16. The self-regulating thermal insulation system according to claim 14, wherein the plurality of pieces of self-regulating thermal insulation are contained within a flexible material.

* * * * *